United States Patent
Hirai et al.

(10) Patent No.: US 7,894,133 B2
(45) Date of Patent: Feb. 22, 2011

(54) OPTICAL ELEMENT AND OPTICAL DEVICE

(75) Inventors: Hideaki Hirai, Kanagawa (JP);
 Yoshiyuki Kiyosawa, Miyagi (JP);
 Kazuhiro Umeki, Iwate (JP); Yasuhiro Fujimura, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 614 days.

(21) Appl. No.: 11/868,048

(22) Filed: Oct. 5, 2007

(65) Prior Publication Data
 US 2008/0106789 A1 May 8, 2008

(30) Foreign Application Priority Data
 Oct. 23, 2006 (JP) .............................. 2006-287502

(51) Int. Cl.
 *G02B 5/30* (2006.01)
(52) U.S. Cl. ....................................... 359/486; 359/574
(58) Field of Classification Search .................. 359/486, 359/574
 See application file for complete search history.

(56) References Cited

U.S. PATENT DOCUMENTS 5,703,861 A * 12/1997 Matsuda ................ 369/110.03
6,122,103 A * 9/2000 Perkins et al. ............... 359/486
6,447,120 B1 * 9/2002 Hansen et al. ................ 353/20
7,113,335 B2 * 9/2006 Sales .......................... 359/486
2006/0039069 A1 * 2/2006 Hayashi et al. ............. 359/486

FOREIGN PATENT DOCUMENTS

JP 7-99402 10/1995
JP 2005-99099 4/2005

* cited by examiner

*Primary Examiner*—Lee Fineman
(74) *Attorney, Agent, or Firm*—Dickstein Shapiro LLP

(57) ABSTRACT

A disclosed optical element includes: a transparent substrate; a subwavelength structure layer disposed on the transparent substrate, the subwavelength structure layer having a refractive index different from a refractive index of the transparent substrate; a minute concave and convex structure of one-dimensional grating formed on the subwavelength structure layer with a subwavelength period smaller than a wavelength to be used, where a concave portion reaches a boundary surface between the transparent substrate and the subwavelength structure layer; and an open hole portion formed on a subwavelength structure layer side of the transparent substrate so as to communicate with the concave portion of the minute structure and to be arranged with the same period as in the minute structure of one-dimensional grating. At least at the open hole portion, a refractive index relative to an incident light is changed in a direction orthogonal to the boundary surface.

12 Claims, 16 Drawing Sheets

P: PITCH
H: GROOVE DEPTH
a: LAND WIDTH
b: SPACE WIDTH
a/P: FILLING FACTOR
H/a: ASPECT RATIO

OPTICAL ELEMENT AND OPTICAL DEVICE

BACKGROUND OF THE INVENTION

1. Field of the Invention

The present invention relates to an optical element and an optical device.

2. Description of the Related Art

A transparent substrate with a grating pattern formed on a surface thereof is known as a wave plate having a minute concave and convex structure of a period (subwavelength period) smaller than a light wavelength to be used. Such a wave plate exhibits optical anisotropy (structural birefringence) based on the grating pattern and is capable of generating phase difference relative to two linearly polarized lights whose planes of polarization are orthogonal to each other.

Important characteristics of the wave plate include transmittance and phase difference. Preferably, the wave plate has high transmittance and in addition to the capability of generating a desired phase difference relative to two linearly polarized lights whose planes of polarization are orthogonal to each other.

The above-mentioned phase difference is expressed by functions such as a refractive index of a transparent substrate material, a groove depth of the grating pattern (minute concave and convex structure) having a subwavelength period, and the like. When the refractive index of a transparent substrate material becomes larger or the depth of the groove of the grating pattern becomes deeper, it is possible to generate a larger phase difference.

However, it is not necessarily easy to manufacture a grating pattern having a subwavelength structure with a large groove depth through molding or the like.

In view of this, Patent Document 1 discloses a phase plate prepared by filling the grating pattern formed on the transparent substrate with a medium having a refractive index sufficiently large in comparison with the refractive index of the transparent substrate and forming a grating pattern with the same period as the grating pattern formed on the transparent substrate so as to generate a larger phase difference. In this phase plate, it is possible to realize such a larger phase difference. However, the medium having the refractive index sufficiently large in comparison with the refractive index of the transparent substrate is disposed on the transparent substrate, so that a quantity of light reflected on a surface of the medium having a large refractive index is increased, so that transmittance is reduced.

In view of such a reduction of transmittance, there is proposed a low refractive index film further formed on the medium having the high refractive index filled into the grating pattern of the transparent substrate, the low refractive index film having a refractive index lower than that of a film material for a high refractive index film (Patent Document 2).

In this film, light is projected onto the low refractive index film from the air side, so that it is possible to reduce reflection on a boundary surface between the air and the low refractive index film and reduce reflection on a boundary surface between the low refractive index film and the high refractive index medium. However, a difference of the refractive indexes between the high refractive index medium and the transparent substrate remains large, so that reflection on a boundary surface between the high refractive index medium and the transparent substrate is not reduced.

Patent Document 1: Japanese Laid-Open Patent Application No. 7-99402

Patent Document 2: Japanese Laid-Open Patent Application No. 2005-099099

SUMMARY OF THE INVENTION

It is a general object of the present invention to provide an improved and useful optical element and optical device in which the above-mentioned problems are eliminated.

A more specific object of the present invention is to provide an optical element that can provide high transmittance and a desired phase difference at the same time and an optical device employing the optical element.

According to one aspect of the present invention, there is provided an optical element comprising: a transparent substrate; a subwavelength structure layer disposed on the transparent substrate, the subwavelength structure layer having a refractive index different from a refractive index of the transparent substrate; and a minute concave and convex structure of one-dimensional grating formed on the subwavelength structure layer with a subwavelength period smaller than a wavelength to be used, where a concave portion reaches a boundary surface between the transparent substrate and the subwavelength structure layer. In other words, the subwavelength structure layer is divided by the concave portion of the minute concave and convex structure in a direction of arranged concavity and convexity.

Further, the optical element according to the present invention includes an open hole portion formed on a subwavelength structure layer side of the transparent substrate so as to communicate with the concave portion of the minute concave and convex structure and to be arranged with the same period as in the minute concave and convex structure of one-dimensional grating. In other words, a bottom of the concave portion of the minute concave and convex structure formed on the subwavelength structure layer communicates with the open hole portion. As a result, in the optical element, the minute concave and convex structure of the subwavelength structure layer and the arrangement of the open hole portion form one-dimensional grating pattern in which the concave portion of the minute concave and convex structure and the open hole portion communicating therewith are used as a unit of a concave structure.

Moreover, in the optical element according to the present invention, at least at the open hole portion, a refractive index relative to an incident light is changed in a direction orthogonal to the boundary surface between the subwavelength structure layer and the transparent substrate.

In other words, structural birefringence is obtained from the one-dimensional grating pattern in which the concave portion of the minute concave and convex structure and the open hole portion communicating therewith are used as a unit of the concave structure. By changing the refractive index relative to an incident light at least at the open hole portion while maintaining a phase difference, it is possible to effectively reduce reflection of light at the one-dimensional grating pattern in which the concave portion of the minute concave and convex structure and the open hole portion communicating therewith are used as a unit of the concave structure, thereby improving transmittance.

A cross-sectional shape of the minute concave and convex structure of one-dimensional grating in the periodic direction formed on the subwavelength structure layer may be a rectangular shape, for example. In this case, the concave portion and a convex portion of the minute concave and convex structure in the subwavelength structure layer have a uniform width in a depth direction of the concave portion. Although the refractive index at these portions is constant in the depth direction of the concave portion, the refractive index at the open hole portion changes in the depth direction, so that it is possible to reduce reflection of light.

According to another aspect of the present invention, the cross-sectional shape of the minute concave and convex structure of one-dimensional grating in a periodic direction formed on the subwavelength structure layer preferably has a shape for changing a width of the convex portion in a height direction of the convex portion. When the width of the convex portion changes in the height direction in this manner in the minute concave and convex structure of the subwavelength structure layer, the refractive index also changes in the depth direction of the concave portion in the minute concave and convex structure. Thus, in combination with the change of refractive index at the open hole portion, it is possible to realize a larger gradation of refractive index in the depth direction of the one-dimensional grating pattern in which the concave portion of the minute concave and convex structure and the open hole portion communicating therewith are used as a unit of the concave structure. Further, it is possible to effectively control an increase of reflectance resulting from a steep change of the refractive index and to further improve the transmittance of the optical element. The above-mentioned change of refractive index may be a continuous change or a graded change including many steps.

According to another aspect of the present invention, the cross-sectional shape of the minute concave and convex structure of one-dimensional grating in the periodic direction formed on the subwavelength structure layer may include a shape in which the width of the convex portion changes in the height direction of the convex portion. Specifically, such a shape may include a trapezoidal shape, a triangular shape, a partially circular shape, or a partially elliptical shape. In addition, the cross-sectional shape may be other shape including a curved slope of a triangular shape.

The above-mentioned triangular shape may be a regular triangle, an isosceles triangle, a right triangle, and the like. The partially circular shape forms a portion of a circle and the partially elliptical shape forms a portion of an ellipse. The minute concave and convex structure is one-dimensional grating, so that when the cross-sectional shape is a partially circular shape or a partially elliptical shape, the convex portion of the minute concave and convex structure becomes a portion of a cylindrical surface or a portion of an elliptic cylindrical surface.

The subwavelength structure layer and the transparent substrate have different refractive indexes of materials. Although both elements are separated, the difference of the refractive indexes is not required to be large but may be substantially the same.

According to another aspect of the present invention, in the optical element, the refractive index of the subwavelength structure layer is preferably higher than the refractive index of the transparent substrate. When the subwavelength structure layer is formed with a material having a high refractive index, it is possible to realize a large phase difference while reducing the depth of the concave portion in the minute concave and convex structure of the subwavelength structure layer. Thus, the minute concave and convex structure is readily formed.

According to another aspect of the present invention, the optical element may have an optical function as a wave plate. Further, in the optical element, the minute concave and convex structure of the subwavelength structure layer and a periodic structure due to the periodic arrangement of the open hole portion (one-dimensional grating pattern in which the concave portion of the minute concave and convex structure and the open hole portion communicating therewith are used as a unit of the concave structure) may be periodically arranged, via a flat portion of a surface of the transparent substrate, in a direction of concavity and convexity arranged in the minute concave and convex structure, thereby forming a polarization selective diffraction grating.

In other words, in this case, the one-dimensional grating pattern in which the concave portion of the minute concave and convex structure and the open hole portion communicating therewith are used as a unit of the concave structure is arranged and formed on a surface of the transparent substrate at predetermined intervals in the direction of arranged concavity and convexity. The arrangement at predetermined intervals in the above-mentioned grating pattern constitutes a polarization selective diffraction grating (one grating pattern forms one grating of the diffraction grating). It is possible to use such an optical element as a polarization selective diffraction grating.

According to another aspect of the present invention, the optical element may have an optical function as a polarization beam splitter.

Although the transparent substrate has a parallel-plate shape in general, the transparent substrate may have a prismatic shape, a wedge-like shape, or the like. Further, the minute concave and convex structure of one-dimensional grating on the subwavelength structure layer may be formed not only on a projection side of light but also on an emission side.

According to another aspect of the present invention, there is provided an optical device including the above-mentioned optical element.

According to another aspect of the present invention, the optical device may be constructed as a projector device for guiding a beam of light emitted from a light source to a liquid crystal display element and projecting a display image of the liquid crystal display element onto a display surface using a projector lens, and the optical element may be disposed on an optical path between the light source and the projector lens.

According to another aspect of the present invention, the optical device may be constructed as an optical pickup device for condensing a beam of light emitted from a light source and irradiating the beam of light onto an optical recording medium via an objective lens so as to record and/or reproduce information, and the optical element may be disposed on an optical path between the light source and the objective lens.

The following briefly describes structural birefringence based on a minute concave and convex structure of one-dimensional grating having a subwavelength period.

FIG. 1A schematically shows a minute concave and convex structure of one-dimensional grating. In FIG. 1A, a cross-sectional shape of the minute concave and convex structure is a rectangular wave shape. In other wards, a cross-sectional shape of a convex portion is a rectangular shape.

As shown in FIG. 1A, a pitch: P of the minute concave and convex structure is expressed by the sum: (a+b) of a pair of "land and space", where a: a width of a land (hereafter referred to as a "land width" as shown in the drawings) and b: a width of a space (hereafter referred to as a "space width" as shown in the drawings). Further, a height of the land relative to a bottom of the space is defined as a "groove depth: H".

In this case, an amount defined by "a/P" is referred to as a filling factor and an amount defined by "H/a" as an aspect ratio. When the filling factor is large, the land width: a is large in the pitch: P, namely, the space width: b is small. When the aspect ratio becomes larger, the groove depth: H relative to the land width: a becomes larger. The aspect ratio is preferably less than 10 in terms of readiness of forming the minute concave and convex structure and more preferably not more than 5.

When the pitch: P of the minute concave and convex structure is in subwavelength order, a light of a wavelength larger than the pitch: P passes through without diffraction as a zero-order light (transmittance in this case is referred to as a zero-order transmittance) and exhibits birefringence relative to an incident light.

In other words, as show in FIG. 1B, the minute concave and convex structure acts as a medium having different refractive indexes relative to an incident light projected from the air area to the minute concave and convex structure and provides polarization components: TM vibrating parallel to a periodic direction of the minute concave and convex structure (right and left directions relative to the drawing) and polarization components: TE vibrating parallel to a longitudinal direction of the land (directions orthogonal to the drawing).

When effective refractive indexes of the minute concave and convex structure are n(TM) for the polarization components: TM and n(TE) for the polarization components: TE, these effective refractive indexed are expressed with a refractive index: n of a material on which the minute concave and convex structure is formed and a filling factor: f of the minute concave and convex structure as follows:

$$n(TE) = \sqrt{\{fn^2 + (1-f)\}} \quad (1)$$

$$n(TM) = \sqrt{[n^2/\{f + (1-f)n^2\}]} \quad (2)$$

In this manner, the polarization components: TE and TM have different refractive indexes, so that a phase of the polarization components: TE is delayed by "δ" relative to the polarization components: TM as shown in FIG. 1B.

In other words, when the groove depth: H is used, optical thicknesses of the minute concave and convex structure are expressed by "H·n(TM)" relative to the polarization components: TM and "H·n(TE)" relative to the polarization components: TE. Accordingly, phase retardation: δ is generated in accordance with a difference of the optical thicknesses: H{n(TE)−n(TM)}. This phase retardation: δ is referred to as retardation.

When the difference of the optical thicknesses: H{n(TE)−n(TM)} is D and a wavelength is λ, δ=2πD/λ. In the minute concave and convex structure, a substantially constant retardation is obtained in a wide area of the wavelength λ.

The n(TE) and n(TM) are determined in accordance with the above-mentioned refractive index: n and filling factor: f. The retardation: δ is determined in accordance with the refractive index: n, filling factor: f, and groove depth: H. Thus, it is possible to obtain a desired retardation by adjusting a material (n is determined) and a form of the minute concave and convex structure (filling factor: f and groove depth: H are determined).

By adjusting the retardation: δ, it is possible to set a difference of the refractive indexes relative to the polarization components: TM and TE to be π or π/2, for example, and realize various types of phase plates such as a ½ wave plate, ¼ wave plate, and the like.

In the above-mentioned example, the cross-sectional shape of the convex portion of the minute concave and convex structure is a rectangular shape and the land width: a and space width: b are uniquely determined and the filling factor: f is also uniquely determined.

By contrast, in a minute concave and convex structure as shown in FIG. 1C, when a cross-sectional shape thereof is a periodic arrangement of a trapezoidal shape, although the pitch: P is uniquely determined, the width of a convex portion is different in accordance with the groove depth. Specifically, at a portion of a groove depth H1, a width is a1 and a filling factor: f1=a1/P and at a portion of a groove depth H2, a width is a2 and a filling factor: f2=a2/P. The filling factor changes in a direction of the groove depth.

Thus, the refractive indexes: n(TE) and n(TM) given by formulas (1) and (2) vary in accordance with the change of the filling factor. In other words, the refractive indexes: n(TE) and n(TM) gradually change in a direction of the groove depth of the minute concave and convex structure.

When the refractive indexes: n(TE) and n(TM) in the above-mentioned H{n(TE)−n(TM)} are replaced with average values: $n_M(TE)$ and $n_M(TM)$ thereof and an optical thickness to be obtained is D, the retardation in this case is given by 2πD/λ.

In other words, when the cross-sectional shape of the convex portion in the minute concave and convex structure is a trapezoidal shape, for example, such that the width of the convex portion changes in a direction of the height of the convex portion, the refractive indexes: n(TE) and n(TM) change in the direction of the height of the convex portion. Thus, a high reflectance generated in a case of a steep change of refractive indexes is relaxed by the gradation of the refractive indexes and the reflectance is reduced, so that transmittance of a zero-order light in the minute concave and convex structure is increased.

In an optical element according to the present invention, the reflectance is effectively reduced by the change of the refractive indexes in an open hole portion so as to increase the transmittance of a zero-order light.

As mentioned above, according to the present invention, it is possible to realize a novel optical element and an optical device including the optical element. The optical element according to the present invention has both desired phase difference and high transmittance at the same time and has preferable optical characteristics. Thus, by employing the optical element, it is possible to realize an optical device having preferable characteristics.

Other objects, features and advantage of the present invention will become more apparent from the following detailed description when read in conjunction with the accompanying drawings.

DETAILED DESCRIPTION OF THE PREFERRED EMBODIMENTS

In the following, embodiments of the present invention are described.

Figure 1A:
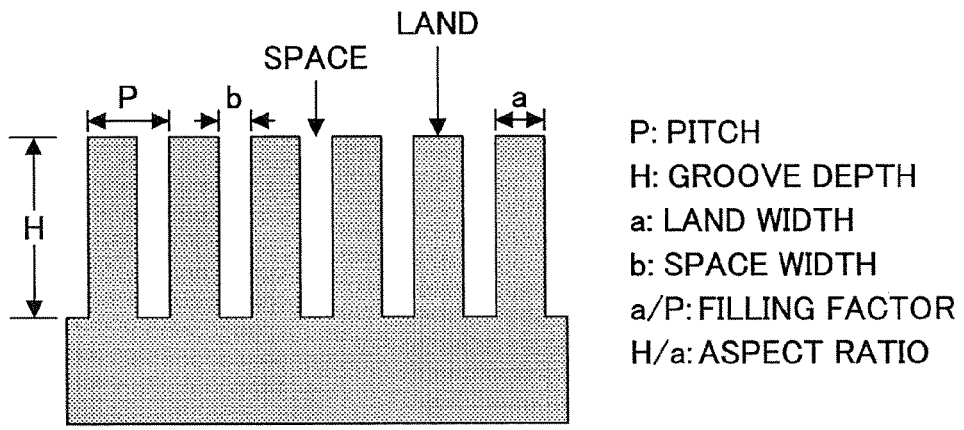
FIG. 1A is a diagram illustrating structural birefringence of a minute concave and convex structure.
Figure 1B:
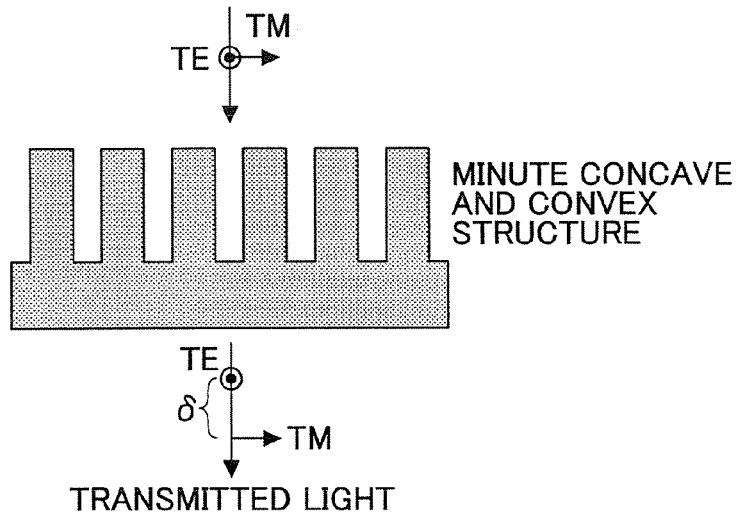
FIG. 1B is a diagram illustrating structural birefringence of a minute concave and convex structure.
Figure 1C:
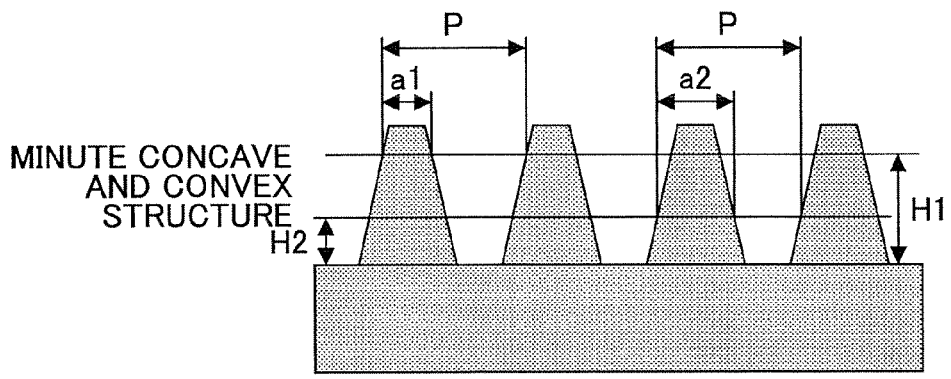
FIG. 1C is a diagram illustrating structural birefringence of a minute concave and convex structure.
Figure 2A:
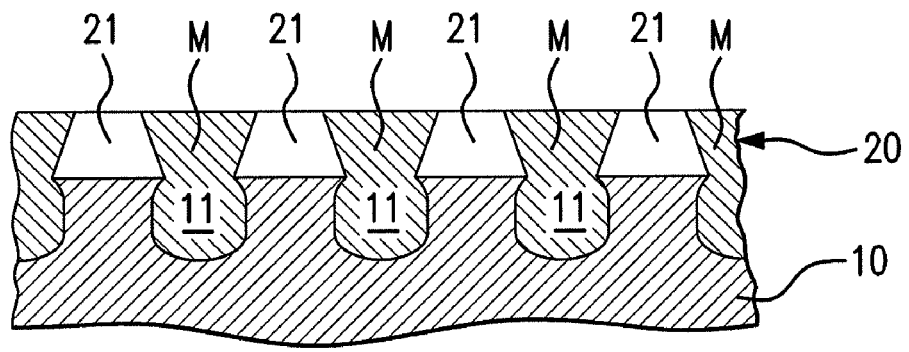
FIG. 2A is a diagram illustrating an embodiment of an optical element.
Figure 2B:
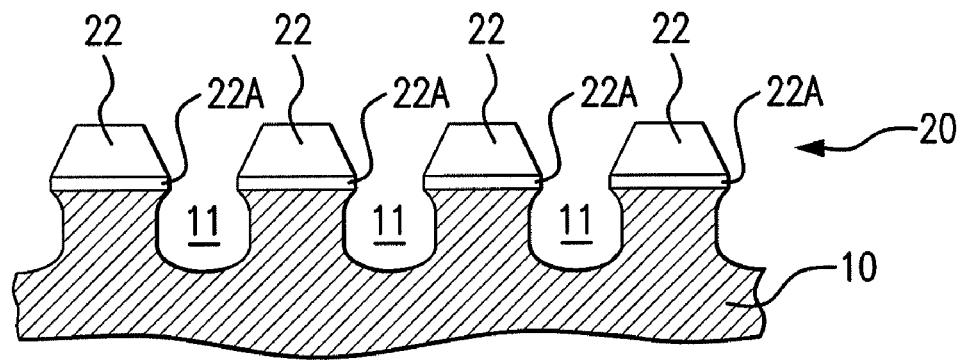
FIG. 2B is a diagram illustrating an embodiment of an optical element.
Figure 2C:
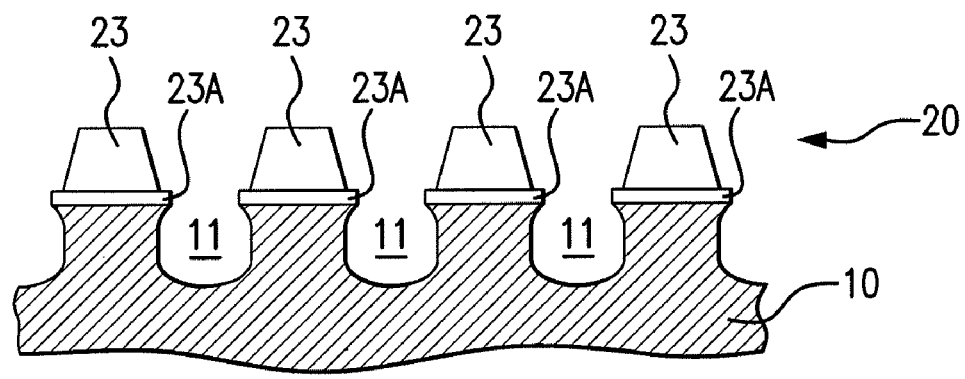
FIG. 2C is a diagram illustrating an embodiment of an optical element.

FIGS. 2A, 2B, and 2C are diagrams illustrating embodiments of an optical element.

In FIGS. 2A, 2B, and 2C, reference numeral 10 indicates a transparent substrate and reference numeral 20 indicates a subwavelength structure layer. The transparent substrate 10 and the subwavelength structure layer 20 are made of different materials and have different refractive indexes.

With reference to FIG. 2A, for example, the optical element in this case includes the transparent substrate 10 and the subwavelength structure layer 20 disposed on the transparent substrate 10, the subwavelength structure layer 20 having a refractive index different from that of the transparent substrate 10. On the subwavelength structure layer 20, a minute concave and convex structure of one-dimensional grating is formed with a subwavelength period smaller than a light wavelength to be used such that a concave portion reaches a boundary surface between the transparent substrate 10 and the subwavelength structure layer 20. Reference numeral 21 indicates the convex portion of the minute concave and convex structure. Since the concave portion reaches the boundary surface between the transparent substrate 10 and the subwavelength structure layer 20, the convex portions 21 constituting the minute concave and convex structure are individualized on the transparent substrate 10 in accordance with the concave portion.

On the other hand, on a subwavelength structure layer 20 side of the transparent substrate 10, open hole portions 11 communicating with the concave portions of the minute concave and convex structure are formed such that the open hole portions 11 are arranged with the same period as in the minute concave and convex structure of one-dimensional grating. In other words, the arrangement of the open hole portions 11 is made with the same period as in the minute concave and convex structure of the subwavelength structure layer 20.

The minute concave and convex structure of the subwavelength structure layer 20 is one-dimensional grating, so that a cross-sectional shape of the minute concave and convex structure is uniform in the direction orthogonal relative to the drawing. Further, a cross-sectional shape of the open hole portion 11 is substantially uniform in the direction orthogonal relative to the drawing.

In the example shown in FIG. 2A, the cross-sectional shape of the minute concave and convex structure of one-dimensional grating in the periodic direction, the minute concave and convex structure being formed on the subwavelength structure layer 20, is determined such that the width of the convex portion changes in a direction of the height of the convex portion. Specifically, the cross-sectional shape is a trapezoidal shape.

FIGS. 2B and 2C show variations of the embodiment shown in FIG. 2A. In the example of FIG. 2B, a bottom portion of a convex portion 22 in the minute concave and convex structure of the subwavelength structure layer 20 forms a stage portion 22A having a rectangular cross-sectional shape. Further, in the example shown in FIG. 2C, a bottom portion of a convex portion 23 having a trapezoidal cross-sectional shape forms a stage portion 23A having a rectangular cross-sectional shape in which a length of the stage portion 23A is slightly larger than a base of the trapezoidal shape.

Figure 3A:
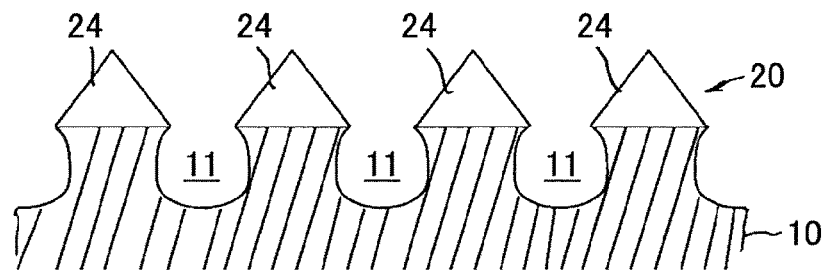
FIG. 3A is a diagram illustrating another embodiment of an optical element.
Figure 3B:
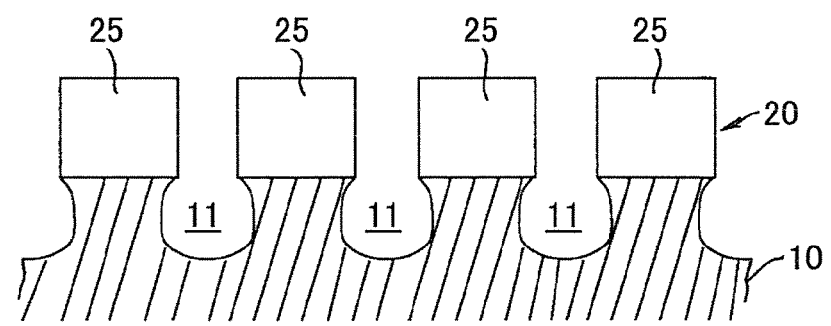
FIG. 3B is a diagram illustrating another embodiment of an optical element.
Figure 3C:
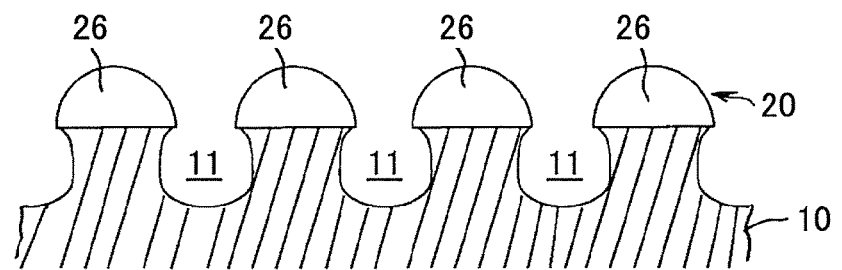
FIG. 3C is a diagram illustrating another embodiment of an optical element.

FIGS. 3A, 3B, and 3C are diagrams illustrating another three embodiments of the optical element. The same reference numerals as in FIGS. 2A, 2B, and 2C are assigned to less confusable portions and description thereof is omitted.

In an example shown in FIG. 3A, a cross-sectional shape of a convex portion 24 in the minute concave and convex structure formed on the subwavelength structure layer 20 is a triangular shape. In an example shown in FIG. 3B, a cross-sectional shape of a convex portion 25 in the minute concave and convex structure formed on the subwavelength structure layer 20 is a rectangular shape. In an example shown in FIG. 3C, a cross-sectional shape of a convex portion 26 in the minute concave and convex structure formed on the subwavelength structure layer 20 is a partially circular shape.

In the three examples shown in FIGS. 2A, 2B, and 2C and the two examples shown in FIGS. 3A and 3C, the width of the convex portion in the minute concave and convex structure formed on the subwavelength structure layer 20 changes in the height direction of the convex portion. Thus, as described with reference to FIG. 3C, the refractive index gradually changes in the minute concave and convex structure.

As described with reference to the embodiments shown in FIGS. 2A, 2b, 2C, 3A, 3B, and 3C, in the optical element according to the present invention, on the subwavelength structure layer 20 side of the transparent substrate 10, the open hole portions 11 communicating with the concave portions of the minute concave and convex structure are formed such that the open hole portions 11 are arranged with the same period as in the minute concave and convex structure of one-dimensional grating. The open hole portion 11 has a function of changing the refractive index relative to an incident light in directions (upward and downward directions in FIGS. 2A, 2B, 2C, 3A, 3B, and 3C) orthogonal relative to the boundary surface between the transparent substrate 10 and the subwavelength structure layer 20.

Preferably, examples of materials for the transparent substrate and the subwavelength structure layer constituting the optical element include quartz (refractive index: n=1.45), BSC7 HOYA CORPORATION (refractive index: n=1.5), and the like.

When the subwavelength structure layer 20 is formed using a material having a refractive index larger than those of the above-mentioned materials, materials for the subwavelength structure layer may include inorganic materials such as $TiO_2$, $Nb_2O_5$, $Ta_2O_5$, $ZrO_2$, $ITO(SnO_2+In_2O_5)$, and the like, sol-gel materials in which elements such as $TiO_2$, $ZrO_2$, $Sb_2O_5$, ITO, $Al_2O_3$ and the like are bonded to the materials, mixed materials in which fine particles (not less than 5 nm to not more than 10 nm) of the above-mentioned inorganic materials are dispersed in sol-gel materials having $SiO_2$ as a skeleton thereof, or photo-setting resin and thermosetting resin having a refractive index of not less than 1.6.

It is possible to mix or blend the above-mentioned mixed materials in accordance with properties thereof. The photo-setting resin and thermosetting resin may be superior in optical properties by using light transmissive adhesive, for example. The subwavelength structure layer made of the above-mentioned inorganic materials has a thermal resistance of not less than 200° C. and is suitable as a material for the subwavelength structure layer of the optical element used under high-temperature environment.

The following describes examples of a parallel plate of quartz (refractive index: n=1.45) as the transparent substrate 10 and $Ta_2O_5$ (refractive index: n=2.25) as a material for the subwavelength structure layer 20.

On a flat surface of the parallel plate of quartz as the transparent substrate 10, a subwavelength structure layer made of $Ta_2O_5$ is formed into a thin layer by a film formation technique such as sputtering, deposition, or the like.

When the subwavelength structure layer 20 is formed using the above-mentioned sol-gel materials, mixed materials, photo-setting resin, or thermosetting resin, the subwavelength structure layer 20 may be formed into a thin layer on the transparent substrate 10 through spin coating or the like.

It is possible to form the minute concave and convex structure of one-dimensional grating having a subwavelength period on the subwavelength structure layer 20 by setting a resist layer in which a latent image is to be formed through electronic beam scanning on the subwavelength structure layer formed into the thin layer, drawing a pattern corresponding to the minute concave and convex structure on the resist layer through the electronic beam so as to form the latent image, developing the latent image so as to obtain a resist pattern corresponding to the minute concave and convex structure, and etching the subwavelength structure layer to a surface of the transparent substrate 10 through etching such as RIE (reactive ion etching) while the resist pattern is used as a mask.

When such an etching method is used, an etching rate is different depending on materials.

By using the difference of etching rates, it is possible to form the open hole portion 11 as shown in the FIGS. 2A, 2B, 2C, 3A, 3B, and 3C. In general, materials with a high refractive index have properties of resisting corrosion through etching. In accordance with this, after the corrosion of the subwavelength structure layer 20 made of the material ($Ta_2O_5$) with a high refractive index is performed to the boundary surface with the transparent substrate 10, by further performing the etching, the transparent substrate 10 is etched at the concave portion of the minute concave and convex structure formed on the subwavelength structure layer 20, thereby forming the open hole portion 11. In this manner, the open hole portion 11 communicating with the concave portion of the minute concave and convex structure is formed on the transparent substrate 10.

It is possible to control a size and a cross-sectional shape of the open hole portion 11 by switching or adjusting conditions of the etching (types of introduced gas, an amount of introduction, time of etching, and the like) in accordance with the materials for the transparent substrate and the subwavelength structure layer. By controlling the size and the cross-sectional shape of the open hole portion 11, it is possible to control a change of a refractive index at the open hole portion and so as to reduce loss of transmittance resulting from reflection on the boundary surface between the subwavelength structure layer 20 and the transparent substrate 10.

Figure 4A:
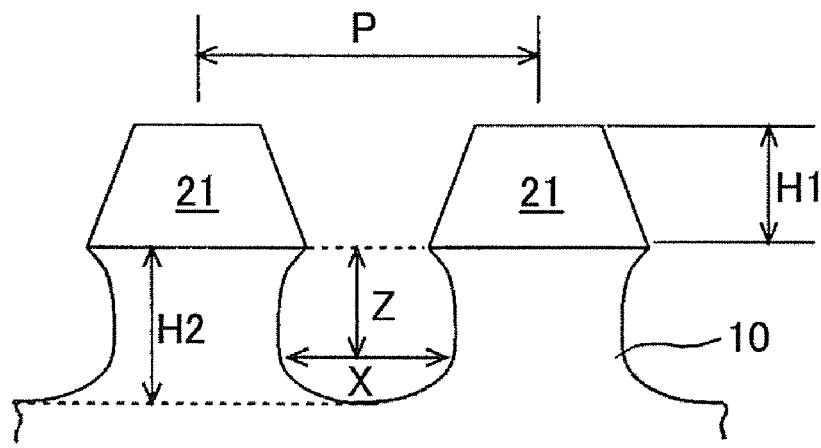
FIG. 4A is a diagram illustrating an optical function of an optical element according to the present invention.

FIG. 4A shows a portion of the embodiment shown in FIG. 2A. In this embodiment, the cross-sectional shape of the convex portion 21 in the minute concave and convex structure is a trapezoidal shape. As mentioned above, in the minute concave and convex structure, the refractive index changes in the upward and downward directions.

Further, the arrangement of the open hole portions 11 constitutes a type of minute concave and convex structure, so that structural birefringence is generated at this portion. However, the cross-sectional shape of the open hole portion 11 is not uniform, so that the filling factor changes in the direction of the depth of the open hole portion 11 so as to cause a change of the refractive index. This gradual change of the refractive index reduces the reflectance.

It is discovered through research by the inventors that the effect of reducing the reflectance from the change of the refractive index at the open hole portion 11 is substantially determined from four values characterizing the size and the shape of the open hole portion 11, namely, from the pitch: P of the minute concave and convex structure (this is also an arrangement pitch of the open hole portions 11), a maximum width: X of the open hole portion 11 in a direction of the arrangement, a depth: H2 of the open hole portion 11, and a depth: Z for defining the maximum width X at the open hole portion 11 as shown in FIG. 4A.

Figure 4B:
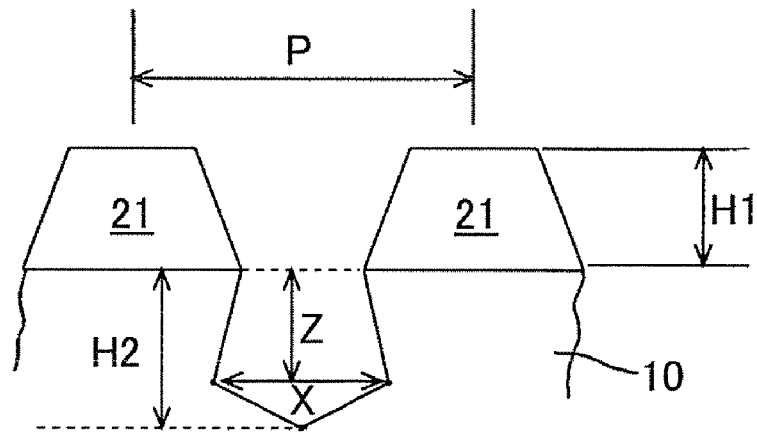
FIG. 4B is a diagram illustrating an optical function of an optical element according to the present invention.
Figure 5A:
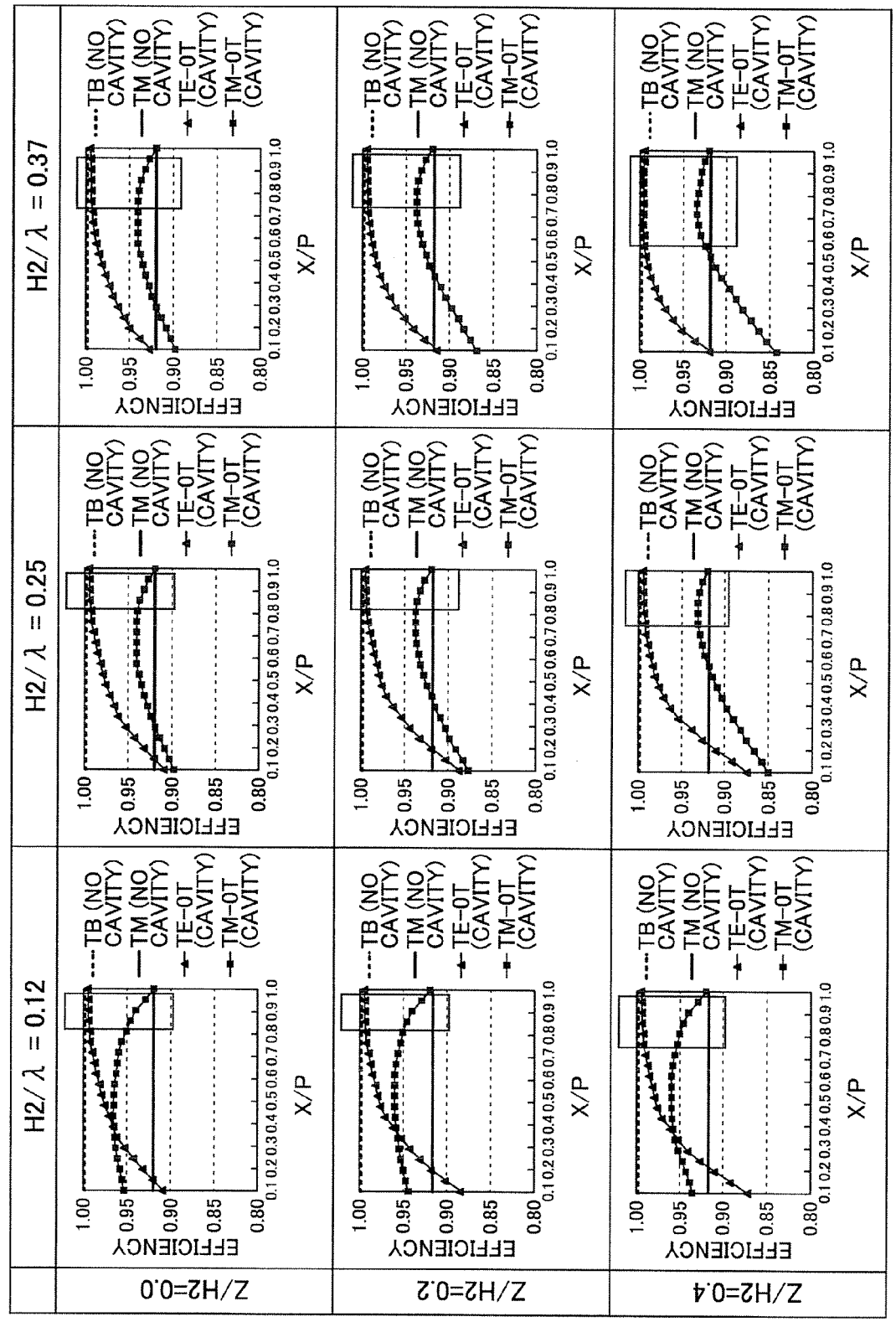
FIG. 5A is a diagram illustrating an optical function of an optical element.
Figure 5B:
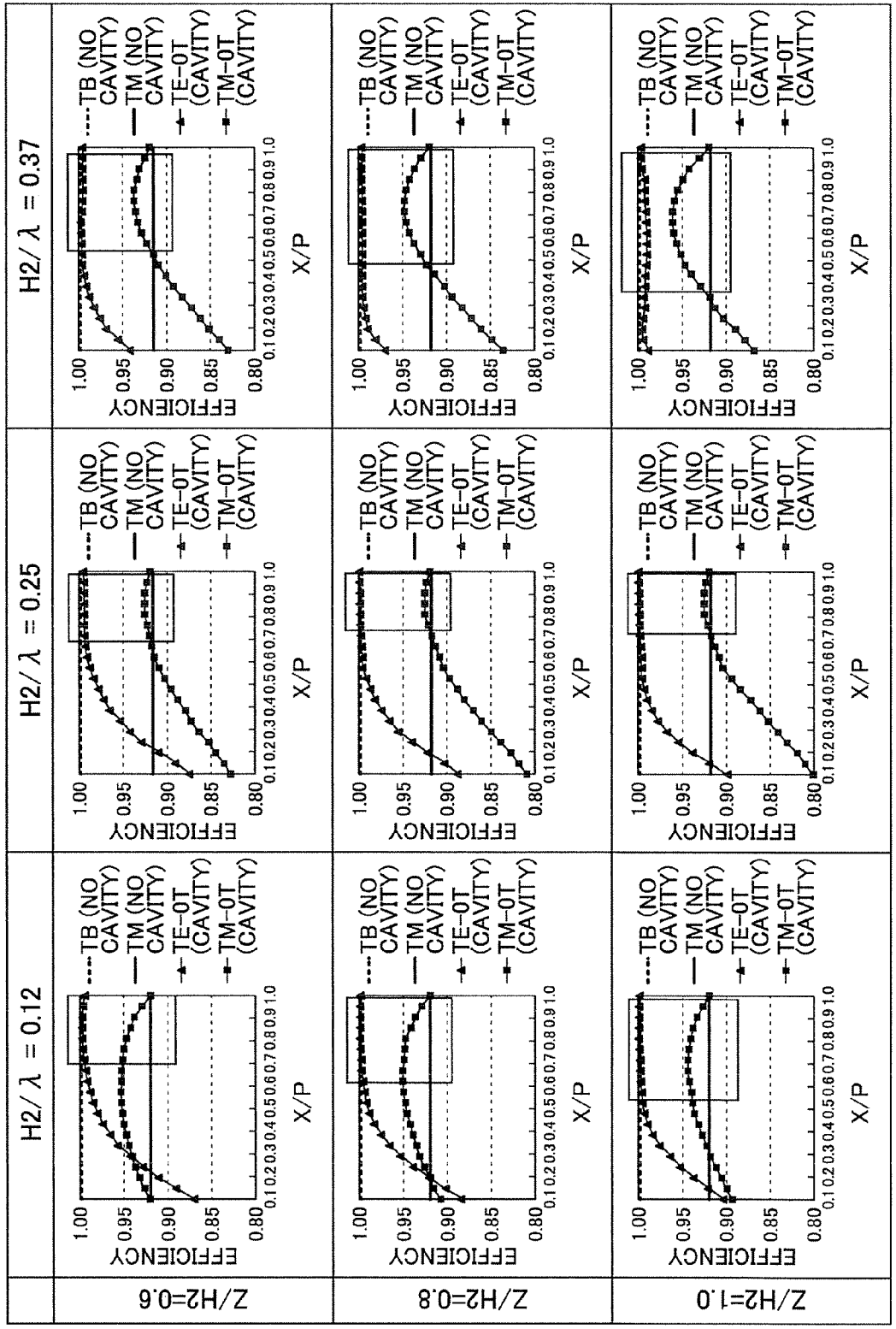
FIG. 5B is a diagram illustrating an optical function of an optical element.
Figure 6A:
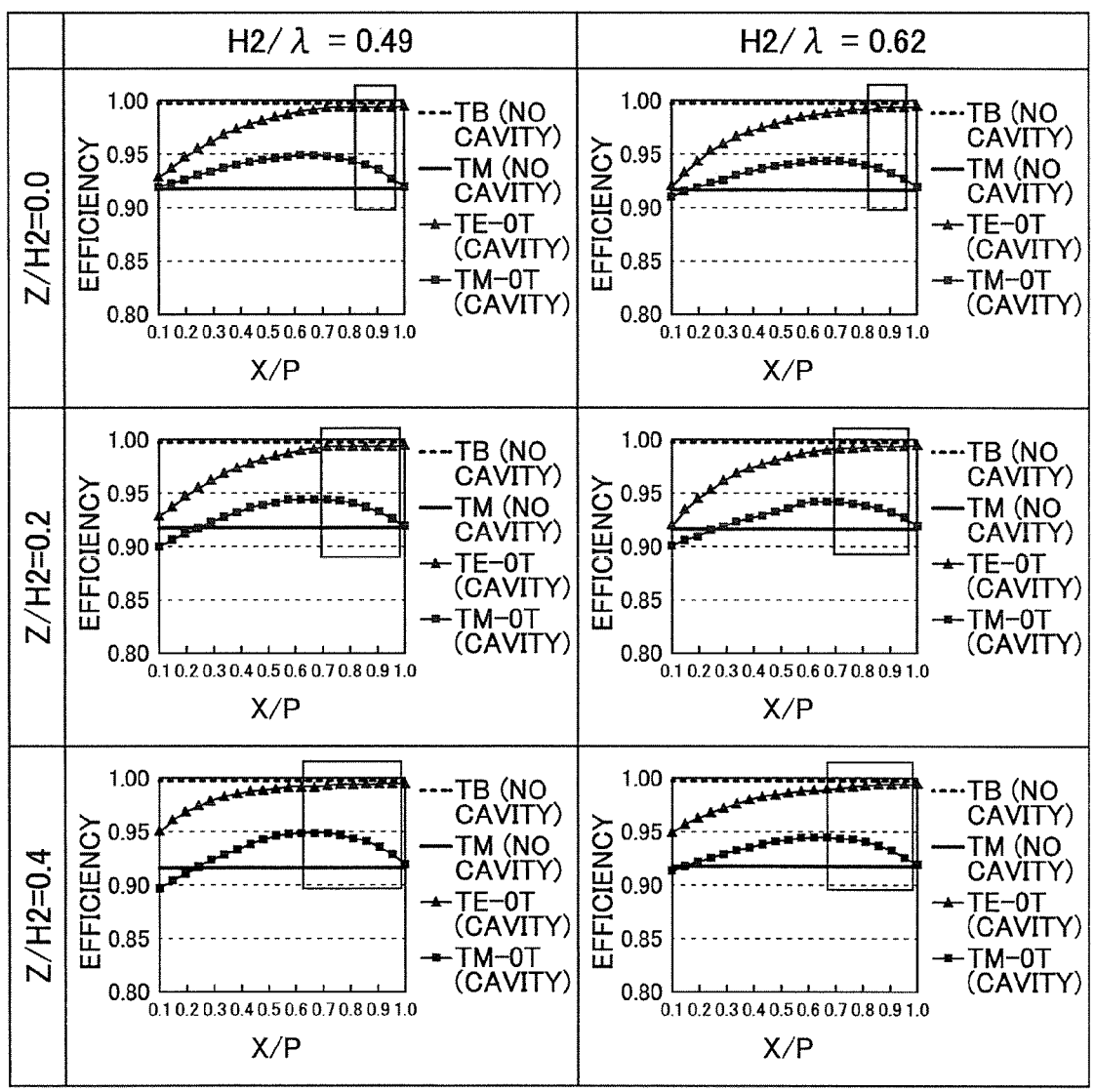
FIG. 6A is a diagram illustrating an optical function of an optical element.
Figure 6B:
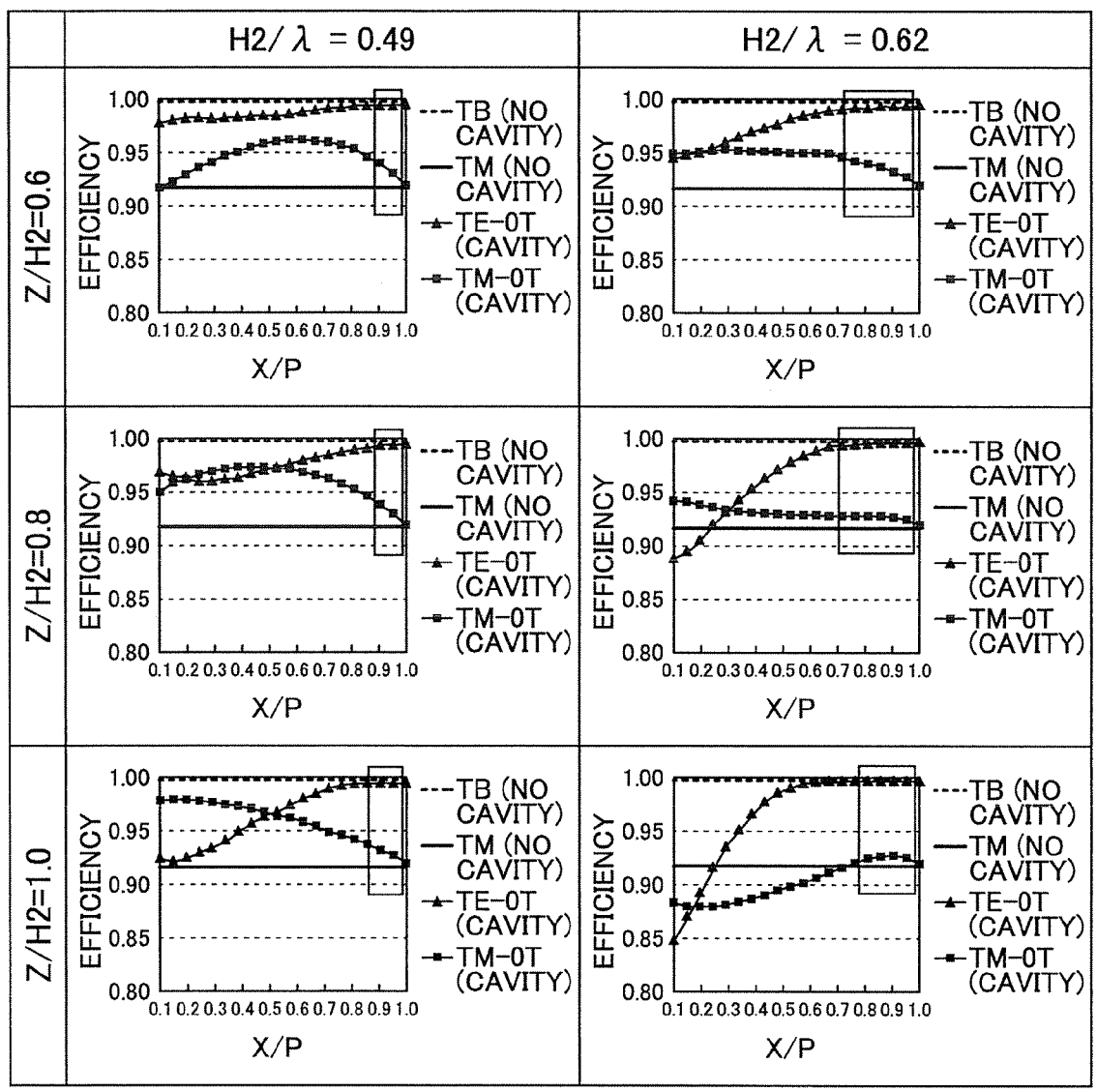
FIG. 6B is a diagram illustrating an optical function of an optical element.

In view of this, a status of FIG. 4A is modeled as having a polygonal cross-sectional shape shown in FIG. 4B. And, transmittance relative to the polarization components: TM and TE is examined using an operation simulation so as to observe the effect of reducing the reflectance from the change of the refractive index.

Conditions of the operation simulation are as follows:

The transparent substrate 10 is a parallel plate of quartz and has the refractive index: n=1.45. The subwavelength structure layer 20 is made of $Ta_2O_5$ and has the refractive index: n=2.25.

Upon performing operation, a quantity having a length dimension is normalized by a wavelength λ to be used and a dimensionless quantity is prepared.

In other words, the pitch of the minute concave and convex structure: P/λ=0.5, the width of the convex portion at the bottom portion of the trapezoidal cross-sectional shape of the convex portion in the minute concave and convex structure: 0.7P/λ=0.35, the width of the concave portion: 0.3P/λ=0.15, and the height of the convex portion (depth of the concave portion): H1/λ=0.74.

Based on the conditions, a depth of the open hole portion: H2/λ and a ratio of the depth Z for defining the maximum width X at the open hole portion 11 to the depth of the open hole portion H2: Z/H2 are used as operational parameters. These parameters: H2/λ and Z/H2 are changed so as to examine a change of transmittance of a zero-order light relative to a change of a ratio of the maximum width X at the open hole portion to the pitch P: X/P. FIGS. 5A, 5B, 6A, and 6B show results.

A vertical axis (Efficiency) of each of FIGS. 5A, 5B, 6A, and 6B indicates the transmittance of a zero-order light, in which the transmittance of the polarization components: TE is 1 when the open hole portion is not formed (only the minute concave and convex structure of the subwavelength structure layer is present on a flat surface of the transparent substrate). In other words, this is when the effect of the open hole portion is not provided and the transmittance of the polarization components: TM in this case is 0.92.

In FIGS. 5A, 5B, 6A, and 6B, "cavity" and "no cavity" indicate a case where the open hole portion is present and a case where the open hole portion is not present, "TE-OT" indicates the transmittance of a zero-order light of the polarization components: TE, and "TM-OT" indicates the transmittance of a zero-order light of the polarization components: TM.

As shown in FIGS. 5A, 5B, 6A, and 6B, although the transmittance of a zero-order light: TE-OT becomes reduced due to the presence of the open hole portion in comparison with the case without the open hole portion, the transmittance of a zero-order light: TE-OT becomes sufficiently large in an area where X/P is large. The transmittance of a zero-order light: TM-OT also becomes larger than the case without the open hole portion depending on a value of X/P.

Figure 7A:
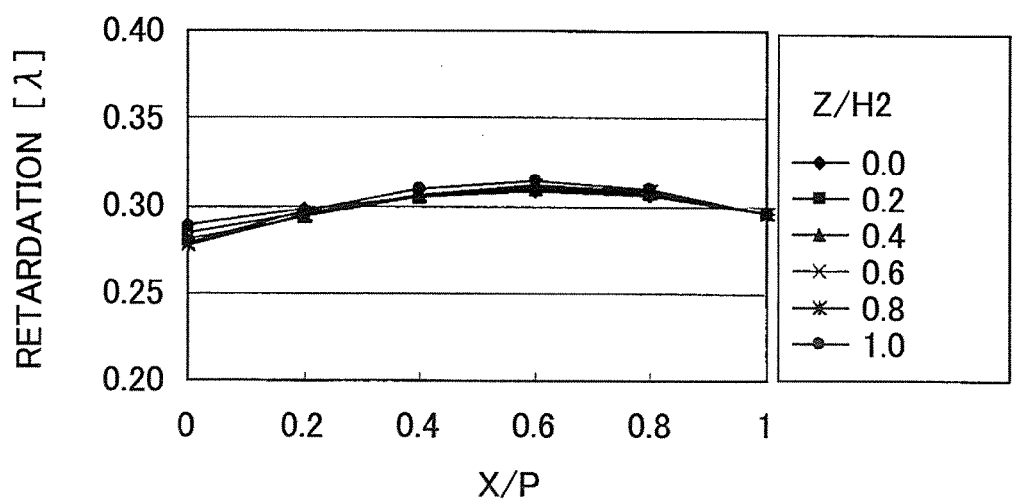
FIG. 7A is a diagram illustrating an optical function of an optical element.
Figure 7B:
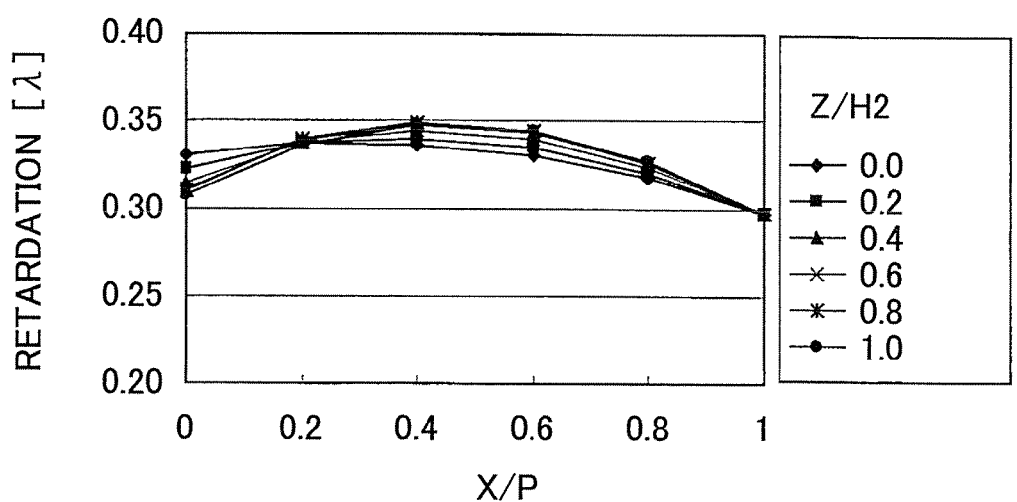
FIG. 7B is a diagram illustrating an optical function of an optical element.

Next, as shown in FIGS. 7A and 7B, a change of retardation based on wavelength: $\lambda$ to be used is obtained relative to the parameters: X/P, where the above-mentioned parameters: H2/$\lambda$ are changed to 0.25 and 0.49 and the above-mentioned parameters: Z/H2 are changed to 0.0 (no open hole portion), 0.2, 0.4, 0.6, 0.8, and 1.0. A vertical axis of FIGS. 7A and 7B indicates retardation.

As clearly understood from FIGS. 7A and 7B, when the depth of the open hole portion: H2 is increased, retardation tends to be increased. In an example illustrated in the drawings, the refractive index of the subwavelength structure layer is high relative to the transparent substrate and an effect of the minute concave and convex structure on the retardation is larger than that of the open hole portion.

In view of the above-mentioned results, by adjusting the depth of the concave portion (height of the convex portion): H1 in the minute concave and convex structure and the depth of the open hole portion: H2 through control on etching conditions, it is possible to realize a desired phase difference while maintaining a high transmittance.

For example, when the optical element is realized as a ¼ wave plate, the ¼ wave plate corresponds to retardation: 0.25$\lambda$, so that the depth of the open hole portion: H2 may be reduced in comparison with the cases of FIGS. 7A and 7B and X/P may be selected such that the retardation becomes 0.25$\lambda$.

In addition, as clearly understood from the above-mentioned description, the cross-sectional shape of the convex portion in the minute concave and convex structure on the subwavelength structure layer is a trapezoidal shape (shape whose width changes in the height direction of the convex portion), so that the gradation of the refractive indexes in the minute concave and convex structure and the gradation of the refractive index at the open hole portion contribute to the improvement of the transmittance (reduction of reflectance) of the zero-order light in the optical element. However, it is possible to improve the transmittance when at least the change of the refractive index at the open hole portion is obtained.

Further, depending on necessity, a portion or an entire portion of the open hole portion and/or a portion or an entire portion of the concave portion in the depth direction in the minute concave and convex structure may be filled with a material as appropriate such that the material has a refractive index further lower than the lower refractive index of one of the transparent substrate and the subwavelength structure layer.

When the optical element is realized as a ½ wave plate, the retardation may be set as 0.5$\lambda$. The minute concave and convex structure may be set such that the retardation: 0.5$\lambda$ is realized. However, instead of realizing in this manner, the subwavelength structure layer may be formed on both sides of the transparent substrate of the parallel plate, the minute concave and convex structure and the arrangement of open hole portions may be formed on both sides, and X/P may be set such that retardation on both sides is 0.25. When the optical element is realized in this manner, it is possible to set a small aspect ratio of the minute concave and convex structure in comparison with the case where the retardation: 0.5$\lambda$ is realized on one side.

Further, when the subwavelength structure layer is formed on one side of the transparent substrate, by forming an antireflection film on the other side of the transparent substrate, it is possible to further improve the transmittance. The antireflection film is formed by depositing a well-known four-layered structure, for example, in which a high refractive index layer and a low refractive index layer are alternately laminated.

Figure 8A:
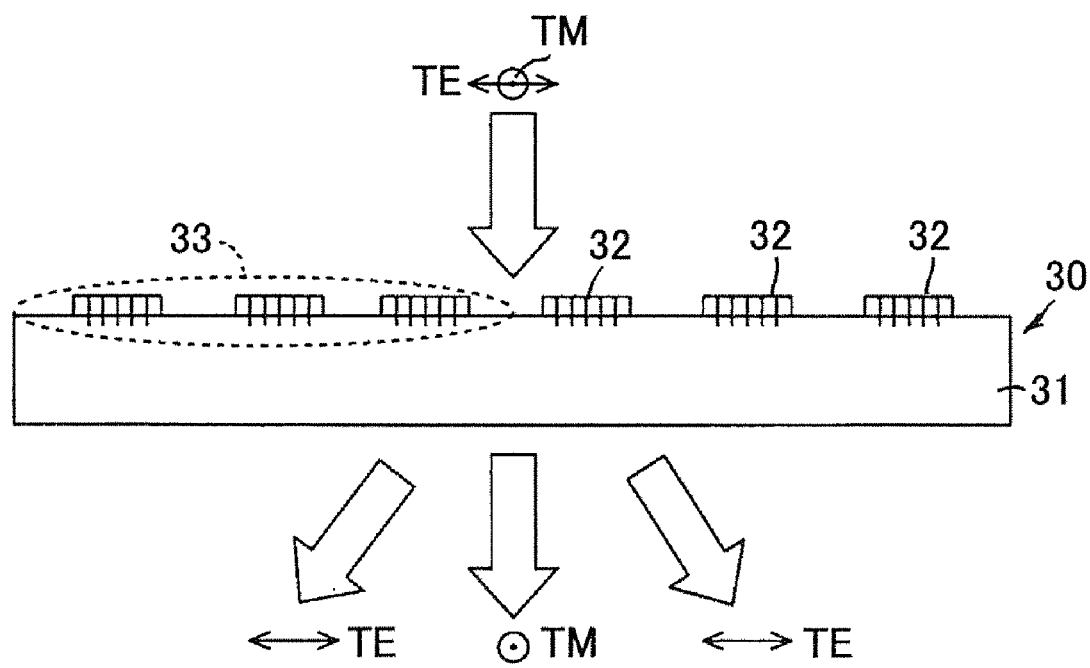
FIG. 8A is a diagram illustrating an embodiment of a polarization selective diffraction grating.

An optical element 30 shown in FIG. 8A is a polarization-selective diffractive element.

The polarization-selective diffraction grating 30 has a structure as shown in FIG. 8A. In FIG. 8A, reference numeral 31 indicates a transparent substrate.

Figure 8B:
FIG. 8B is a diagram illustrating an embodiment of a polarization selective diffraction grating.

FIG. 8B shows a surface portion of the optical element in an enlarged manner which is indicated by reference numeral 33 in FIG. 8A. As shown in FIG. 8B, a periodic structure (indicated by reference numeral 32 in FIG. 8A) including the minute concave and convex structure made of an arrangement of convex portions 321 and a periodic arrangement of open hole portions 311 is formed periodically in a concave and convex arrangement direction (right and left directions relative to the drawing) of the minute concave and convex structure via a flat portion 31A of the transparent substrate 31, thereby forming a diffraction grating. In other words, each of the periodic structures 32 shown in FIG. 8A corresponds to each grating of the diffraction grating.

The polarization-selective diffractive element 30 is a polarization-selective diffraction grating. When a phase difference between light waves passing through the periodic structure 32 and light waves passing through the flat portion 31A is 2$\pi$, diffracted waves are made of transmitted waves of only a zero-order light. When the phase difference is $\pi$, all diffracted waves are made of transmitted waves of a first order light without including those of a zero-order light. When the minute concave and convex structure and the arrangement of open hole portions are set in the polarization-selective diffractive element such that the phase difference: 2$\pi$ is provided to the polarization components: TE (plane of vibration is parallel to the drawing) and the phase difference: $\pi$ is provided to the polarization components: TM (plane of vibration is orthogonal to the drawing) using optical anisotropy in the periodic structure 32, the polarization components: TE waves pass through and all the polarization components: TM are diffracted.

In such a polarization-selective diffractive element, the presence of the open hole portion generates an effect of reducing a loss of reflectance.

Figure 9:
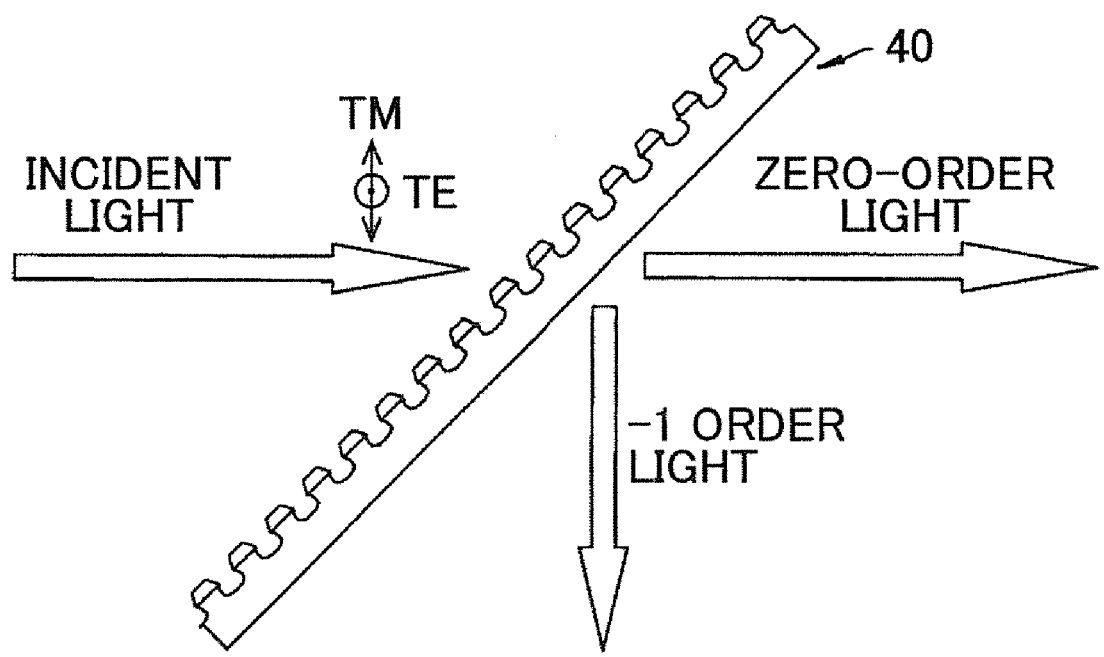
FIG. 9 is a diagram illustrating an embodiment of a polarization beam splitter.

An optical element 40 shown in FIG. 9 is a polarization beam splitter. In the same manner as in FIGS. 2A, 2B, 2C, 3A, 3B, and 3C, in the optical element 40, the minute concave and convex structure is formed on the subwavelength structure layer formed on the transparent substrate and the periodic arrangement of open hole portions is formed on the transparent substrate while communicating with the concave portions of the minute concave and convex structure. A cross-sectional shape of the convex portion of the minute concave and convex structure may have various shape as shown in FIGS. 2A, 2B, 2C, 3A, 3B, and 3C.

In a diffractive element made of an isotropic homogeneous medium having a scalar range (grating pitch is sufficiently larger than a wavelength), polarization dependency is not developed in diffraction efficiency thereof. However, when a grating structure is the minute concave and convex structure and the pitch is in a subwavelength range, optical anisotropy dependent on the grating structure, namely, structural birefringence is developed, so that polarization dependency is generated in diffraction efficiency. Thus, it is possible to provide a function of a polarization beam splitter to the minute concave and convex structure.

In the example shown in FIG. 9, the polarization components: TM pass straight through as a zero-order light and the polarization components: TE are diffracted as a first order diffracted light. When a diffraction angle is set to be 45 degrees relative to the optical element 40, as shown in the figure, it is possible to separate the zero-order light (polarization components: TM) and the first order diffracted light (polarization components: TE) to be orthogonal to each other. In this case, the presence of the open hole portion generates the effect of reducing a loss of reflectance.

In the following, an optical device employing the optical element according to the present invention is described.

Figure 10:
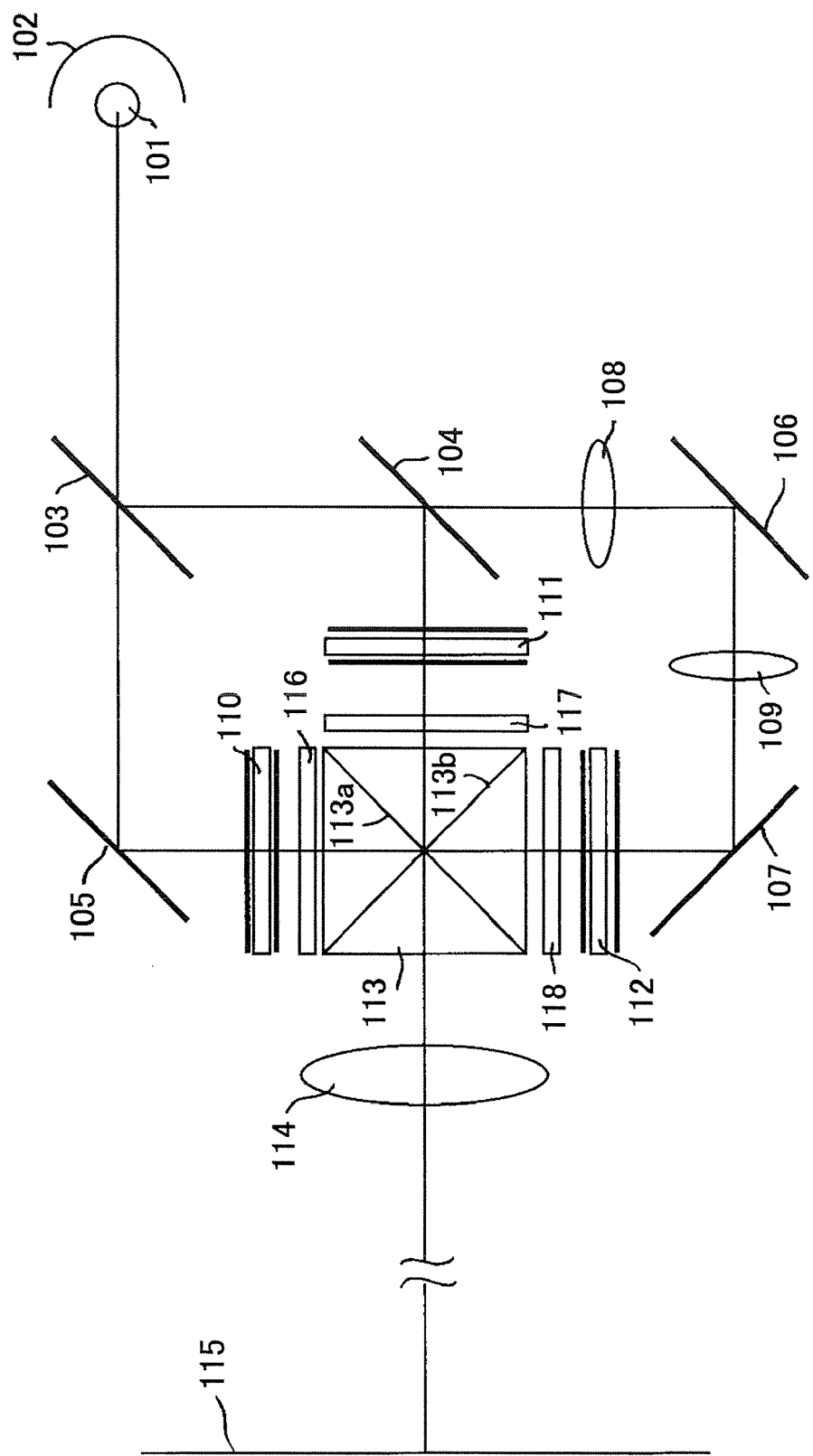
FIG. 10 is a diagram illustrating an embodiment of a projector device as an optical device.

An optical device shown in FIG. 10 is a projector device.

The projector device includes three liquid crystal display elements 110, 111, and 112 individually forming a color image corresponding to each of the three primary colors, a cross prism 113 synthesizing image lights projected from these liquid crystal display elements, and wave plates 116, 117, and 118 in three optical paths between the liquid crystal display elements and the cross prism 113. Wave plates corresponding to the above-mentioned ½ wave plate are used as the wave plates 116, 117, and 118.

A white light emitted from a white light source 101 is reflected by a reflector 102 and is projected onto a dichroic mirror 103. The dichroic mirror 103 allows light having a wavelength not more than the blue wavelength range to pass through and reflects light having a wavelength more than the blue wavelength range. Thus, in the white light projected onto the dichroic mirror 103, blue components pass through the dichroic mirror 103 and green components and red components are reflected by the dichroic mirror 103 and are projected onto a dichroic mirror 104.

The dichroic mirror 104 allows light having a wavelength not less than the red wavelength range to pass through and reflects light having a wavelength less than the red wavelength range. Thus, in the light projected onto the dichroic mirror 104, green components are reflected by the dichroic mirror 104 and red components pass through the dichroic mirror 104. In this manner, the white light emitted from the white light source 101 is separated to the components of light of the three primary colors including red, green, and blue.

The blue components of light passed through the dichroic mirror 103 are reflected by a mirror 105 and projected onto the liquid crystal display element 110. The green components of light reflected by the dichroic mirror 104 are projected onto the liquid crystal display element 111. The red components of light passed through the dichroic mirror 104 travel through an optical path constructed using a relay lens 108, a mirror 106, a relay lens 109, and a mirror 107 and is projected onto the liquid crystal display element 112. The relay lenses 108 and 109 correct an optical path length for the red components of light.

The liquid crystal display elements 110, 111, and 112 are formed by holding a liquid crystal layer between a pair of polarizers. Polarization directions of the pair of polarizers holding the liquid crystal layer therebetween are orthogonal to each other.

The components of each color of light become linearly polarized upon passing through the polarizer on a projection side of the corresponding liquid crystal display element and are projected onto the liquid crystal layer. Image signals are applied to the liquid crystal display elements 110, 111, and 112 so as to display a blue image, a green image, and a red image, respectively. A plane of polarization of a light passing through the liquid crystal layer at a position of a pixel of an image to be projected is turned by 90 degrees so as to have the same polarization direction as in the polarizer on the projection side and the light passes through the polarizer on the projection side.

In this manner, the blue components of light whose intensity is modulated in a two-dimensional manner in accordance with the blue image (hereafter referred to as a blue image light) are emitted from the liquid crystal display element 110. In the same manner, the green components of light whose intensity is modulated in a two-dimensional manner in accordance with the green image (hereafter referred to as a green image light) are emitted from the liquid crystal display element 111. The red components of light whose intensity is modulated in a two-dimensional manner in accordance with the red image (hereafter referred to as a red image light) are emitted from the liquid crystal display element 112. In other words, the liquid crystal display elements 110, 111, and 112 individually form images corresponding to the three primary colors (blue, green, and red).

The image lights of each color emitted from each liquid crystal display element have polarization directions parallel to a surface of the drawing.

The blue image light emitted from the liquid crystal display element 110 is projected onto the wave plate 116 and the green image light and the red image light emitted from the liquid crystal display elements 111 and 112, respectively, are projected onto the wave plates 117 and 118, respectively.

The wave plates 116, 117, and 118 correspond to ½ wave plates, so that a phase difference of ½ wavelength is provided relative to two orthogonal components of a light passing through. The image lights of each color projected onto the wave plates are polarized in the surface parallel to the drawing as mentioned above, so that the planes of polarization of the transmitted lights are turned by 90 degrees relative to the direction upon projection and the transmitted lights become a beam of light polarized in the direction orthogonal to the drawing. Then the transmitted lights are projected onto each of corresponding surfaces.

The cross prism 113 is a rectangular parallelepiped made of an optically-transparent material whose cross-sectional shape is a square when viewed from the direction orthogonal relative to the drawing and the cross prism 113 has reflection planes 113a and 113b orthogonal to each other. The reflection plane 113a employs a dichroic mirror reflecting light having a wavelength not more than the blue wavelength range and allowing light having a wavelength more than the blue wavelength range to pass through. The reflection plane 113b employs a dichroic mirror reflecting light having a wavelength not less than the red wavelength range and allowing light having a wavelength less than the red wavelength range to pass through.

In the image lights of each color projected onto the cross prism 113, the blue image light is reflected by the reflection plane 113a and the red image light is reflected by the reflection plane 113b, the green image light passes through the reflection planes 113a and 113b, so that each of the lights is guided in the same direction, the colors are synthesized, and the lights are emitted from the cross prism 113. The emitted beam of light is projected onto a projector lens 114 and is projected onto a screen 115 as a display surface by the projector lens 114, thereby displaying a projected image.

The reflection planes 113a and 113b have directional properties relative to a polarizing axis of a reflected light or a transmitted light and transmittance of one polarization direction is generally higher than that of the other polarization direction. In view of this, in order to optimize the polarization direction of the light projected onto the cross prism 113 and the polarizing axis of the reflection plane, the wave plates 116, 117, and 118 corresponding to ½ wave plates are inserted before the cross prism 113. In this embodiment, the wave plates 116, 117, and 118 corresponding to ½ wave plates are inserted for the image lights of each color of blue, green, and red. However, the above-mentioned wave plate may be inserted for only one of the image lights.

Figure 11:
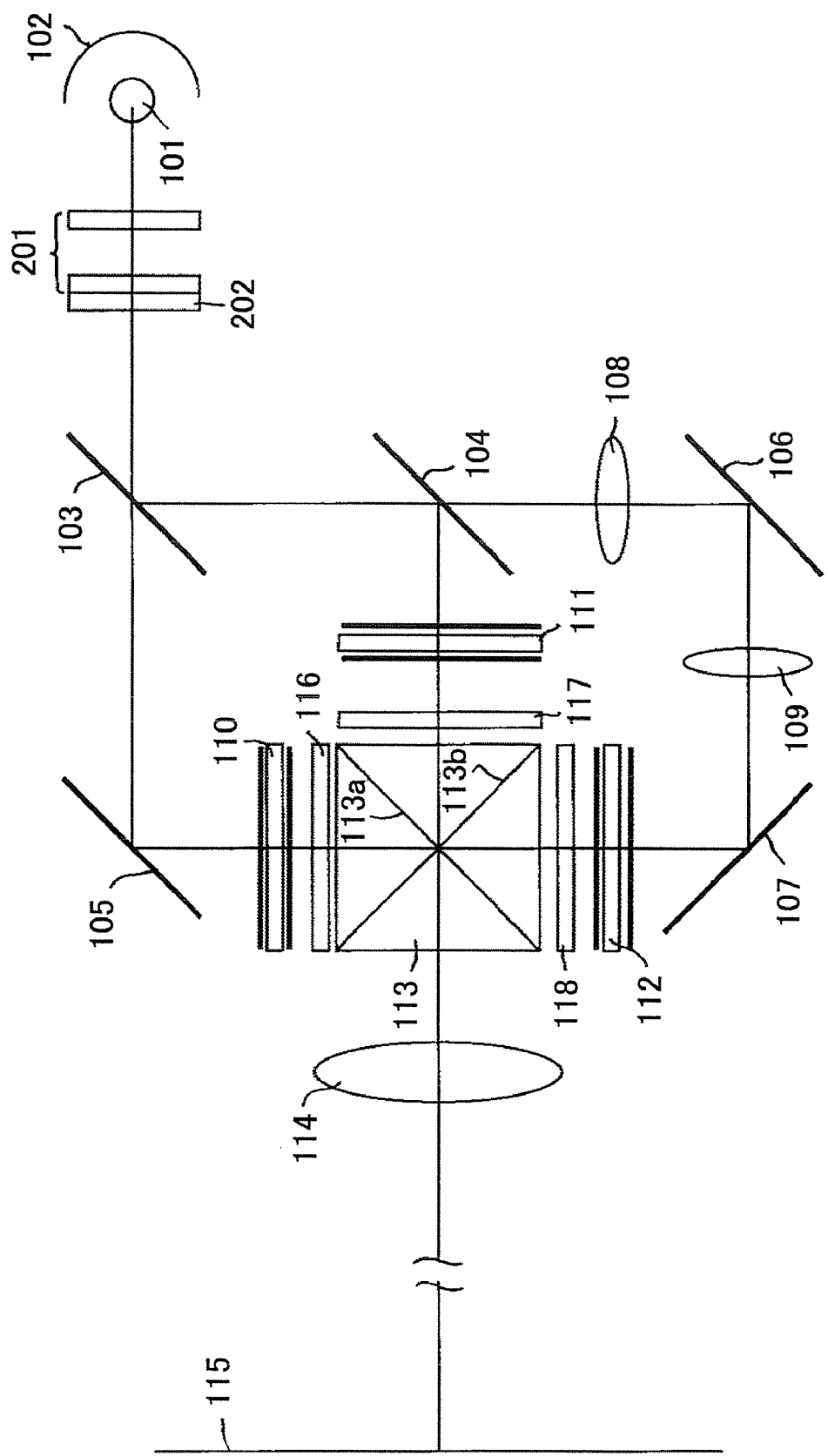
FIG. 11 is a diagram illustrating another embodiment of a projector device as an optical device.

FIG. 11 is a diagram illustrating a variation of the embodiment shown in FIG. 10. In FIG. 11, the same reference numerals as in FIG. 10 are assigned to relevant elements and description thereof is omitted.

A projector device in FIG. 11 includes a uniform illumination unit 201 (optical integrator) and a polarization conversion unit 202 between the white light source 101 and the dichroic mirror 103 in the projector device of FIG. 10.

The uniform illumination unit 201 as an optical integrator is for having a substantially uniform quantity of light irradiated onto the liquid crystal display element. The uniform illumination unit 201 may employ a well-known element made of a fly-eye lens, a rod lens, a rectangular lens array, and the like where appropriate.

The polarization conversion unit 202 is employed for effectively using a light from the white light source 101 and arranging polarization directions of light projected onto the liquid crystal display elements so as to illuminate a projected image on the screen.

The liquid crystal display elements 110, 111, and 112 use polarization properties of liquid crystal and are capable of realizing a high contrast. However, the liquid crystal layer is held between the pair of polarizers, so that when a light projected onto each liquid crystal display element is naturally polarized as in the embodiment shown in FIG. 10, a quantity of illuminating light projected onto each liquid crystal display element is blocked and reduced by half upon passing through the polarizer on the projection side. Thus, efficiency of the use of light is deteriorated.

The polarization conversion unit 202 is for converting a polarization state of the illuminating light emitted from the light source from a natural polarization state to a linear polarization state while substantially maintaining light intensity thereof. When the polarization direction of the illuminating light linearly polarized in this manner is arranged to be the same as the polarization direction of the polarizer on the projection side, it is possible to use substantially 100% of the illuminating light emitted from the light source for displaying the projected image.

Figure 12A:
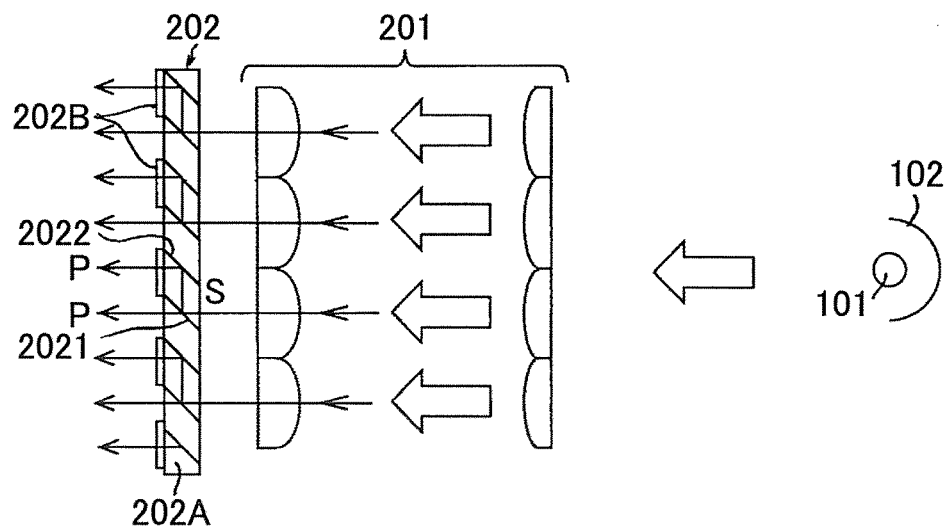
FIG. 12A is a diagram illustrating a uniform illumination unit and a polarization conversion unit of the projector device of FIG. 10.
Figure 12B:
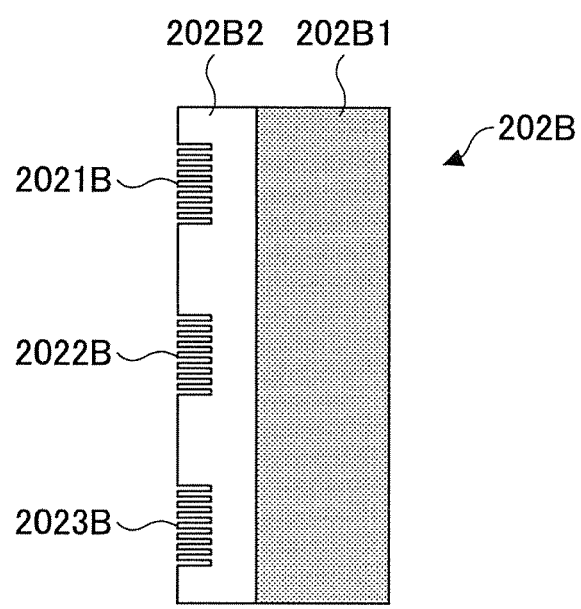
FIG. 12B is a diagram illustrating a uniform illumination unit and a polarization conversion unit of the projector device of FIG. 10.

FIGS. 12A and 12B are diagrams illustrating a status where a white beam of light emitted from the light source is equalized by the uniform illumination unit 201 and the polarization state is converted by the polarization conversion unit 202.

The white beam of light emitted from the light source passes through the well-known uniform illumination unit 201 constructed by disposing a pair of condenser lens arrays (fly-eye lens arrays) in an opposing manner and is projected onto the polarization conversion unit 202. The polarization conversion unit 202 includes an optical substrate 202A and a wave plate portion 202B.

As shown in FIG. 12A, the optical substrate 202A includes a polarization separation surface 2021 and a reflection surface 2022 tilted by 45 degrees relative to an optical axis of the illuminating light.

The polarization separation surface 2021 separates a projected light to a reflected light S (hereafter referred to as an S component) and a transmitted light P (hereafter referred to as a P component) whose planes of polarization are orthogonal to each other. The reflection surface 2022 reflects the S-component and directs the S-component in substantially the same direction as a traveling direction of the P component.

A combination of the polarization separation surface 2021 and the reflection surface 2022 is used as one unit. Plural units constructed in this manner are disposed on a transmission area for the illuminating light so as to form what is called a polarizing prism lens array. In each polarizing prism constituting the array, the illuminating light passing through the prism is separated to the S-component and the P component.

The wave plate portion 202B turns a plane of polarization of the S-component emitted from the optical substrate 202A by 90 degrees, so that the polarization direction of the S-component is arranged to be the same as the polarization direction of the P-component. In accordance with this, it is possible to obtain a linearly polarized illuminating light in which polarization directions are arranged in the same direction. The polarization direction of the illuminating light is the same as the polarization direction of the polarizer on the projection side in each liquid crystal display element.

FIG. 12B is a diagram illustrating the wave plate portion 202B. In the wave plate portion 202B, minute concave and convex structures 2021B, 2022B, 2023B, and the like whose cross-sectional shape is a rectangular shape are formed as a subwavelength structure on a surface of a thin layer 202B2 made of a material having a refractive index: not more than 1.6 formed on one side of a glass plate 202B1. Each of the minute concave and convex structure 2021B and the like are provided with a function of a wave plate corresponding to a ½ wave plate. The glass plate 202B1 is integrated with a surface where the illumination light in which polarization directions are arranged is emitted in the optical substrate 202A. The minute concave and convex structure 2021B and the like are formed on a portion where the S-component is emitted. A connection between the wave plate portion 202B and the optical substrate 202A may be formed by disposing the thin layer 202B2 on a side of the optical substrate 202A. When the connection is formed in this manner, it is possible to preferably protect the minute concave and convex structure with the glass plate 202B1.

Further, the thin layer 202B2 may be directly formed on the optical substrate 202A without using the glass plate 202B1. In this case, the above-mentioned wave plate may be used as the wave plate portion 202B. In addition, the minute concave and convex structures 2021B, 2022B, 2023B, and the like whose cross-sectional shape is a rectangular shape formed on the surface of the thin layer 202B2 formed on one side of the glass plate 202B1 may be formed such that the concave portion reaches the glass plate 202B1 and the open hole portions may be formed in the glass plate while communicating with each concave portion so as to improve transmittance of a zero-order light in the wave plate portion.

Figure 13:
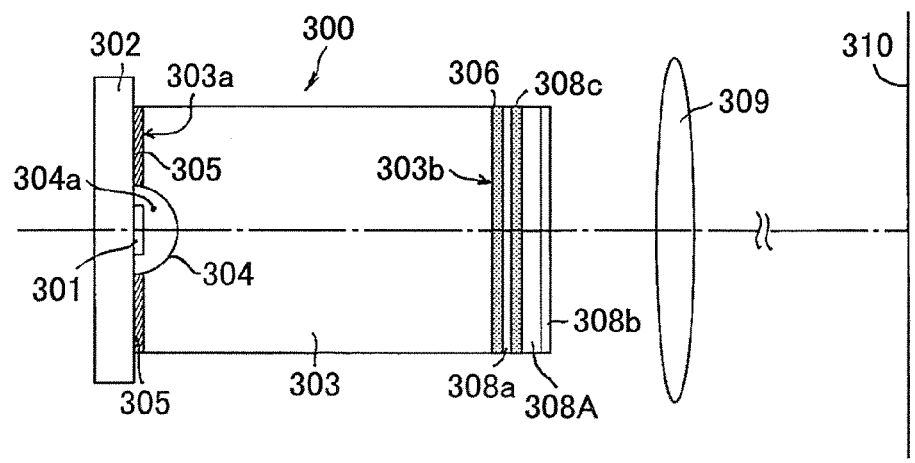
FIG. 13 is a diagram illustrating another embodiment of a projector device as an optical device.

FIG. 13 is a diagram illustrating a variation of another embodiment of a projector device.

The projector is a single-panel type and includes an illumination device 300 emitting a white light, a liquid crystal display device modulating the emitted white light so as to form a color image, and a projector lens 309 projecting a displayed color image.

The illumination device 300 includes a substrate 302, an LED chip 301 mounted on the substrate 302 and emitting a white light, and as an illumination distribution equalizing unit equalizing illumination distribution of light emitted from the LED chip 301, a rod lens 303, a filler 304a, a reflection layer 305, and a wave plate 306. The filler 304a is formed using a material having a refractive index higher than that of the rod lens 303 and is filled in a space between a boundary surface 304 formed as a concave surface on a LED chip 301 side of the rod lens 303 and the LED chip 301. The wave plate 306 disposed on an end face 303b of a light emission side of the rod lens 303 corresponds to a ¼ wave plate.

The liquid crystal display device includes a liquid crystal display element 308A, a polarizer 308a, a color filter 308c disposed on a projection side thereof, and a polarizer 308b disposed on an emission side thereof. Directions of planes of polarization (referred to as polarization directions) of the polarizers 308a and 308b are orthogonal to each other. The color filter 308c separates a white light to the three primary colors of red, green, and blue.

The LED chip 301 emits a white light when electricity is supplied. The emitted white light is propagated in the filler 304a, projected onto the boundary surface 304 with the rod lens 303, and then projected onto the rod lens 303. Since the filler 304a has a refractive index higher than that of the rod lens 303, the white light is refracted at the boundary surface 304 such that the refracted light comes close to an optical axis of the rod lens 303 (right and left directions of the drawing).

The white light in the rod lens 303 is propagated while repeating total reflection on a wall surface of the rod lens 303. An illumination distribution at the end face 303b of the light emission side becomes uniform by the repetition of the total reflection.

The white light emitted from the end face 303b of a light emission side of the rod lens 303 is projected onto the ¼ wave plate 306. The white light emitted from the LED chip 301 is randomly polarized, so that the white light passes through the ¼ wave plate 306 as a randomly polarized light. The white light is projected onto the polarizer 308a and a p-polarization component parallel to the polarization direction of the polarizer 308a passes straight through the polarizer 308a and is projected onto the liquid crystal display element 308A via the color filter 308c.

An s-polarization component orthogonal to the polarization direction of the polarizer 308a is reflected by the polarizer 308a, projected onto the ¼ wave plate 306 again, and converted to a right-handed circularly polarized light, for example. Then the right-handed circularly polarized light is propagated in the rod lens 303, reflected by the reflection layer 305 formed on a surface 303a on an LED chip side of the rod lens 303, and projected onto the polarizer 308a again via the rod lens 303. Upon reflection by the reflection layer 305, the right-handed circularly polarized light is converted to a left-handed circularly polarized light and projected onto the ¼ wave plate 306 to be converted to the p-polarization component. The p-polarization component passes through the polarizer 308a and is projected onto the liquid crystal display element 308A via the color filter 308c.

In this manner, most of the white light emitted from the LED chip 301 is efficiently projected onto the color filter 308c with a uniform illumination distribution. The white light is separated to the three primary colors of red, green, and blue by the color filter 308c and planes of polarization are turned by the liquid crystal display element 308A in accordance with image information. Upon passing through the polarizer 308b, a color image light is formed and the color image light is projected onto a screen 310 by the projector lens 309, thereby forming a color projected image.

The projector device is a single-panel type projector device including the single illumination device 300 provided with the LED chip 301 emitting a white light, the color filter 308c, and the single liquid crystal display device. It is possible to realize such a projector device with reduced size and weight at low cost.

In addition, although the LED chip 301 emitting a white light is used in this embodiment, three types of LED chips emitting red, green, and blue lights may be used instead of the LED chip 301. When the three LED chips emitting each color of red, green, and blue lights are disposed instead of the LED chip 301 in this manner, the three LED chips may be caused to continuously emit lights at one time using a color filter 81 or the three LED chips may be caused to cyclically emit lights without using the color filter 308c. In this manner, the necessity of the color filter 308c is eliminated and it is possible to further reduce the cost of the projector device.

In this projector device, the wave plate 306 corresponding to a ¼ wave plate and the polarizers 308a and 308b are used. However, the above-mentioned wave plate having retardation: 0.25λ or polarization beam splitter may be used as the wave plate and polarizers.

Figure 14:
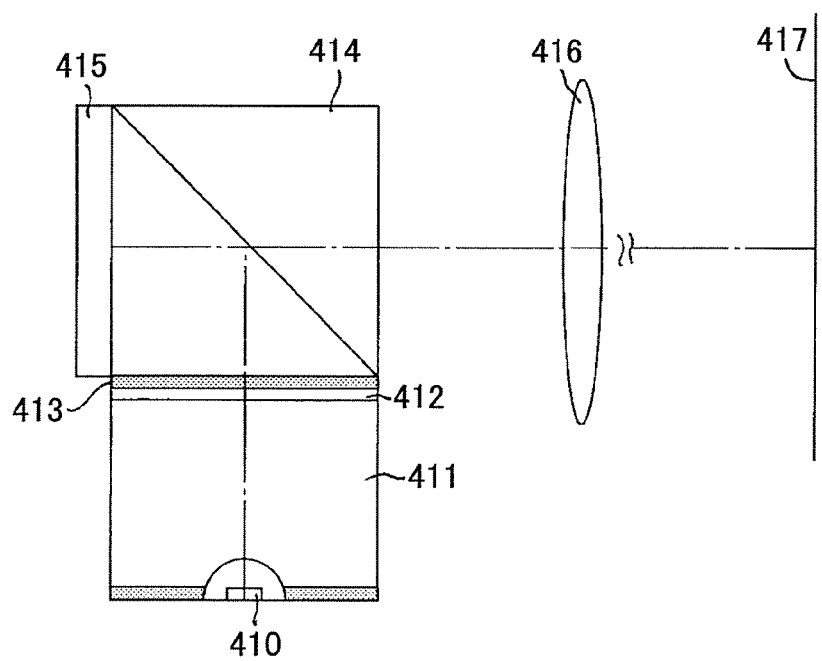
FIG. 14 is a diagram illustrating another embodiment of a projector device as an optical device.

FIG. 14 is a diagram illustrating a variation of another embodiment of a projector device.

A projector device shown in FIG. 14 employs a reflective liquid crystal display element.

The projector device includes a light source device which is the same as in FIG. 13, an LED 410 emitting a white light, a rod lens 411, and the like. The white light whose illumination distribution is made uniform by the rod lens 411 passes through a polarizer 413 via a wave plate 412 corresponding to a ¼ wave plate. The transmitted light is reflected on a bounded surface of a polarization beam splitter 414 and is projected onto a reflective liquid crystal display element 415.

The reflective liquid crystal display element 415 performs spatial modulation for turning a plane of polarization of a projected light in accordance with an image signal. In this embodiment, an LCOS (Liquid Crystal on Silicon) element capable of high-speed switching is used. A reflected light converted to a p-polarized light based on the image signal passes through the polarization beam splitter 414 and is projected onto the projection lens 416 as an image light. Then, the image light is projected onto a screen 417 in an enlarged manner.

The above-mentioned polarization beam splitter (FIG. 9) may be used as the polarizer 413 or the polarizer 413. Further, the above-mentioned wave plate having retardation: 0.25λ may be used as the wave plate 412 corresponding to a ¼ wave plate.

Figure 15:
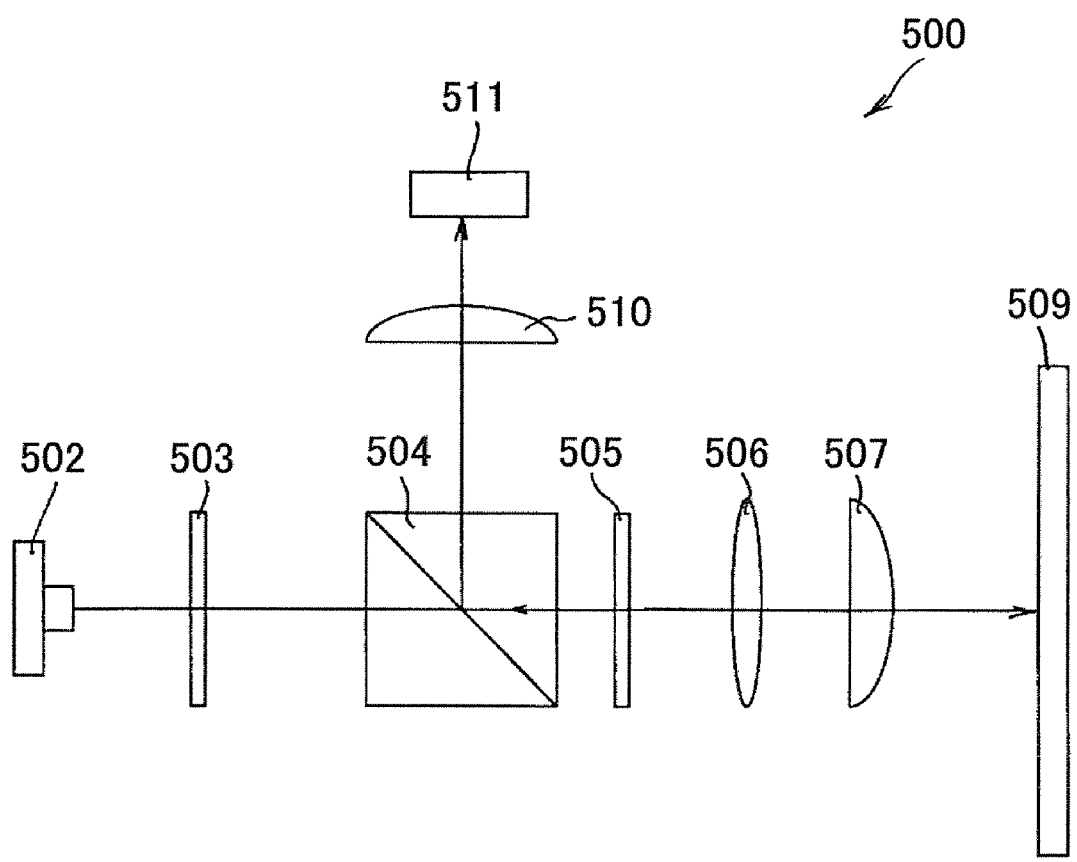
FIG. 15 is a diagram illustrating an embodiment of an optical pickup device as an optical device.

FIG. 15 is a diagram illustrating an optical pickup device as an embodiment of an optical device. In an optical pickup device 500, a light emitted from a light source 502 of semiconductor laser, for example, successively passes through a diffraction grating 503, a polarization beam splitter 504, a ¼ wave plate 505, a collimator lens 506, and an objective lens 507. Then, the light is irradiated onto an optical recording medium 509. A reflected light (return light) is projected onto the polarization beam splitter 504 via the objective lens 507 and the ¼ wave plate 505 and is projected onto a cylindrical lens 510. The returning light provided with astigmatism by the cylindrical lens 510 is detected as read data by a photo detector 511.

The above-mentioned polarization selective diffraction grating (FIGS. 8A and 8B) may be used as the diffraction grating 503. The above-mentioned polarization beam splitter (FIG. 9) may be used as the polarization beam splitter 504. Further, the above-mentioned wave plate having retardation: 0.25λ may be used as the ¼ wave plate 505.

The present invention is not limited to the specifically disclosed embodiment, and variations and modifications may be made without departing from the scope of the present invention.

The present application is based on Japanese priority application No. 2006-287502 filed Oct. 23, 2006, the entire contents of which are hereby incorporated herein by reference.

What is claimed is:

1. An optical element comprising:
    a transparent substrate;
    a subwavelength structure layer disposed on the transparent substrate, the subwavelength structure layer having a refractive index different from a refractive index of the transparent substrate;
    a minute concave and convex structure of one-dimensional grating formed on the subwavelength structure layer with a subwavelength period smaller than a wavelength to be used, where a concave portion reaches a boundary surface between the transparent substrate and the subwavelength structure layer; and
    an open hole portion formed on a subwavelength structure layer side of the transparent substrate so as to communicate with the concave portion of the minute concave and convex structure and to be arranged with the same period as in the minute concave and convex structure of one-dimensional grating,
    wherein at least at the open hole portion, a refractive index relative to an incident light is changed in a direction orthogonal to the boundary surface, and
    wherein the optical element further includes a first portion located in the concave portion, and having a refractive index lower than that of any of the transparent substrate and the subwavelength structure layer.

2. The optical element according to claim 1, wherein a cross-sectional shape of the minute concave and convex structure of one-dimensional grating in a periodic direction formed on the subwavelength structure layer has a shape for changing a width of a convex portion in a height direction of the convex portion.

3. The optical element according to claim 2, wherein the cross-sectional shape of the minute concave and convex structure of one-dimensional grating in the periodic direction formed on the subwavelength structure layer includes a trapezoidal shape, a triangular shape, a partially circular shape, or a partially elliptical shape.

4. The optical element according to claim 1, wherein the refractive index of the subwavelength structure layer is higher than the refractive index of the transparent substrate.

5. The optical element according to claim 1, wherein the optical element has an optical function as a wave plate.

6. The optical element according to claim 1, wherein the minute concave and convex structure of the subwavelength structure layer and a periodic structure due to the periodic arrangement of the open hole portion are periodically arranged, via a flat portion of a surface of the transparent substrate, in a direction of concavity and convexity arranged in the minute concave and convex structure, thereby forming a polarization selective diffraction grating.

7. The optical element according to claim 1, wherein the optical element has an optical function as a polarization beam splitter.

8. The optical element according to claim 1, further including a second portion located in the open hole portion, and having the refractive index lower than that of any of the transparent substrate and the subwavelength structure layer.

9. The optical element according to claim 8, wherein the second portion is formed so as to fill the open hole portion in a depth direction of the open hole portion.

10. An optical device comprising:
    an optical element including:
    a transparent substrate;
    a subwavelength structure layer disposed on the transparent substrate, the subwavelength structure layer having a refractive index different from a refractive index of the transparent substrate;
    a minute concave and convex structure of one-dimensional grating formed on the subwavelength structure layer with a subwavelength period smaller than a wavelength to be used, where a concave portion reaches a boundary surface between the transparent substrate and the subwavelength structure layer; and
    an open hole portion formed on a subwavelength structure layer side of the transparent substrate so as to communicate with the concave portion of the minute concave and convex structure and to be arranged with the same period as in the minute concave and convex structure of one-dimensional grating,
    wherein at least at the open hole portion, a refractive index relative to an incident light is changed in a direction orthogonal to the boundary surface, and
    wherein the optical element further includes a first portion located in the concave portion, and having a refractive index lower than that of any of the transparent substrate and the subwavelength structure layer.

11. The optical device according to claim 10, wherein the optical device is constructed as a projector device for guiding a beam of light emitted from a light source to a liquid crystal display element and projecting a display image of the liquid crystal display element onto a display surface using a projector lens, and the optical element is disposed on an optical path between the light source and the projector lens.

12. The optical device according to claim 10, wherein the optical device is constructed as an optical pickup device for condensing a beam of light emitted from a light source and irradiating the beam of light onto an optical recording medium via an objective lens so as to record and/or reproduce information, and the optical element is disposed on an optical path between the light source and the objective lens.

* * * * *